(12) United States Patent
Vaughn

(10) Patent No.: US 7,637,076 B2
(45) Date of Patent: Dec. 29, 2009

(54) MOMENT-RESISTANT BUILDING COLUMN INSERT SYSTEM AND METHOD

(76) Inventor: Willaim B. Vaughn, P.O. Box 1064, Lafayette, CA (US) 94549

( * ) Notice: Subject to any disclaimer, the term of this patent is extended or adjusted under 35 U.S.C. 154(b) by 470 days.

(21) Appl. No.: 11/373,719

(22) Filed: Mar. 10, 2006

(65) Prior Publication Data

US 2007/0209314 A1 Sep. 13, 2007

(51) Int. Cl.
E04C 3/00 (2006.01)
E04B 1/00 (2006.01)
E04B 1/38 (2006.01)
E04B 5/00 (2006.01)
F16L 41/00 (2006.01)
F16G 11/00 (2006.01)

(52) U.S. Cl. .............................. 52/838; 52/835; 52/272; 52/702; 403/200; 403/217; 403/169

(58) Field of Classification Search ................. 52/831, 52/835, 838, 649.3, 655.1, 656.6, 252, 253, 52/272, 167.1, 702, 289; 403/200, 201, 217–219, 403/169–178
See application file for complete search history.

(56) References Cited

U.S. PATENT DOCUMENTS

| | | | | |
|---|---|---|---|---|
| 3,319,691 A | * | 5/1967 | Fisher | 411/96 |
| 3,593,477 A | * | 7/1971 | Briggs | 52/253 |
| 4,065,825 A | | 1/1978 | Cohen | |
| 4,235,559 A | * | 11/1980 | Rooklyn | 403/262 |
| 4,368,998 A | | 1/1983 | Pestoor | |
| 5,259,160 A | * | 11/1993 | Carannante | 52/252 |
| 5,289,665 A | * | 3/1994 | Higgins | 52/655.1 |
| 5,410,847 A | * | 5/1995 | Okawa et al. | 52/272 |
| 5,412,913 A | * | 5/1995 | Daniels et al. | 52/79.13 |
| 5,595,040 A | | 1/1997 | Chen | |
| 5,680,737 A | * | 10/1997 | Sheipline | 52/655.1 |
| 5,901,525 A | * | 5/1999 | Doeringer et al. | 52/835 |
| 6,032,431 A | * | 3/2000 | Sugiyama | 52/656.9 |
| 6,138,427 A | * | 10/2000 | Houghton | 52/655.1 |
| 6,219,989 B1 | * | 4/2001 | Tumura | 52/838 |
| 6,293,063 B2 | | 9/2001 | Van Doren | |
| 6,390,719 B1 | * | 5/2002 | Chan | 403/205 |
| 6,516,583 B1 | * | 2/2003 | Houghton | 52/655.1 |
| 6,532,713 B2 | | 3/2003 | Katayama et al. | |
| 6,679,023 B2 | | 1/2004 | Rizzotto | |
| 6,694,700 B1 | * | 2/2004 | Mackett | 52/764 |
| 6,739,099 B2 | * | 5/2004 | Takeuchi et al. | 52/167.1 |
| 6,754,992 B1 | * | 6/2004 | Byfield et al. | 52/36.5 |

(Continued)

Primary Examiner—Richard E Chilcot, Jr.
Assistant Examiner—Andrew J Triggs
(74) Attorney, Agent, or Firm—James E. Parris

(57) ABSTRACT

The invention is a novel moment-resistant building column insert system for distributing lateral and vertical loads between the column-beam and column-foundation connections. Loads are distributed between the column and beam using a column insert, nut plates and beam end plates incorporated to beam-ends. The column insert is hollow and similar cross-section shape to the building column for inserting there to. The column, column insert, nut plates and endplates have patterns of mounting holes for receiving mounting bolts tightened to nuts held by nut plates. Loads are distributed between the column and foundation using a base plate, column insert, and insert plates integrated with anchor bolts, nuts and washers in a concrete foundation. The base plate having mounting holes is incorporated to the building column bottom end to receive the plurality of anchor bolts there through for fixedly tightening as an exposed end of the column insert fits in the column.

17 Claims, 13 Drawing Sheets

U.S. PATENT DOCUMENTS

| | | | |
|---|---|---|---|
| 6,829,872 B2 * | 12/2004 | Wahlsteen | 52/741.1 |
| 6,837,016 B2 * | 1/2005 | Simmons et al. | 52/655.1 |
| 7,021,020 B2 * | 4/2006 | Simmons et al. | 52/656.9 |
| 7,127,863 B2 * | 10/2006 | Simmons | 52/838 |
| 7,178,296 B2 * | 2/2007 | Houghton | 52/261 |
| 7,310,920 B2 * | 12/2007 | Hovey, Jr. | 52/655.1 |
| 2002/0184836 A1 * | 12/2002 | Takeuchi et al. | 52/167.1 |
| 2003/0041549 A1 * | 3/2003 | Simmons et al. | 52/655.1 |
| 2003/0177732 A1 * | 9/2003 | Wahlsteen | 52/655.1 |
| 2004/0074161 A1 * | 4/2004 | Kasai et al. | 52/167.1 |
| 2004/0139683 A1 * | 7/2004 | Simmons | 52/719 |
| 2004/0244330 A1 * | 12/2004 | Takeuchi et al. | 52/729.1 |
| 2005/0055954 A1 * | 3/2005 | Simmons | 52/633 |
| 2005/0066612 A1 * | 3/2005 | Simmons | 52/633 |
| 2005/0072108 A1 * | 4/2005 | Simmons et al. | 52/720.1 |
| 2005/0193680 A1 * | 9/2005 | Wang | 52/656.9 |
| 2006/0150562 A1 * | 7/2006 | Simmons et al. | 52/655.1 |
| 2007/0209314 A1 * | 9/2007 | Vaughn | 52/720.1 |
| 2007/0261356 A1 * | 11/2007 | Vaughn | 52/655.1 |

* cited by examiner

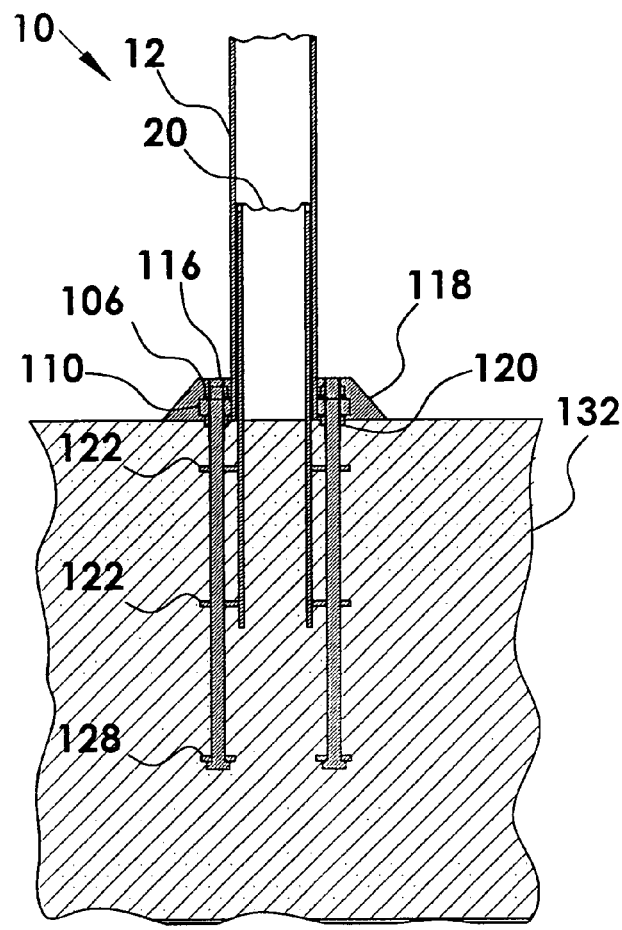
FIG. 11a
FIG. 11b
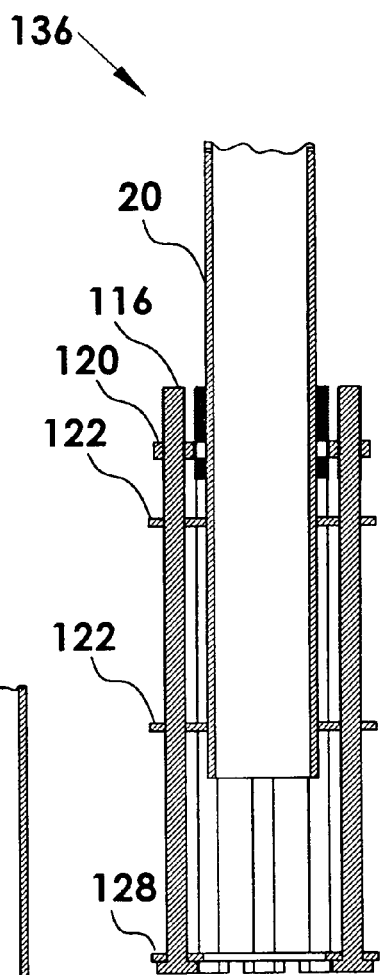
FIG. 11c

MOMENT-RESISTANT BUILDING COLUMN INSERT SYSTEM AND METHOD

FIELD OF INVENTION

The current invention relates to building structure, and in particular a novel moment-resistant building column insert system for distributing lateral and vertical loads between the column-beam and column-foundation connections.

The loads are distributed between the column and beam by interconnecting the beams to columns using a column insert, nut plate assemblies, nuts & bolts, and plates incorporated to the beam ends. The column insert is hollow and generally similar shape to the hollow column inner walls for inserting thereto. The column insert walls are provided with mounting holes for aligning with mounting holes in the building column walls and with mounting holes in the beam endplates for receiving mounting bolts there through and tightening with the nuts held by nut plate assemblies positioned along the inner walls of the column insert. Supplemental beam seats may be added to the column for erection purposes. Supplemental plates may be added to the column for additional strength. The insert may be installed in the column at any position, and portions of columns may be incorporated to the insert.

The loads are distributed between the building column and foundation by interconnecting the foundation to the column using the moment-resistant column insert system having a column base plate, with a column port in the plate center, transversely welded near the column bottom. A column insert, insert plates and a plurality of anchor bolts having anchor nuts and washers are assembled for incorporating in a concrete foundation before hardening such that the column insert, insert plates and anchor bolts are partially seated in the concrete and partially extending up from the concrete foundation. The extended portion of the column insert is inserted to the column, where the base plate transversely incorporated to the column bottom end has a plurality of mounting holes arranged in a pattern along the base plate perimeter receive the plurality of anchor bolts there through for fixedly tightening.

BACKGROUND OF INVENTION

Discussion of Prior Art

Moment resistant frames offer advantages over shear walls or braced frames by providing more obstruction-free internal structures for facilitating design of exterior walls, partitions, and ceilings and the placement of building contents such as furniture and equipment. Moment resistant structures also allow the structure to deflect in an earthquake or a windstorm to absorb energy.

Seismic resistance is created by using moment-resistant frame structures between the column(s) and the foundation, and between the column(s) and the beams that are typically at the floors and the roof. Moment-resisting frame structures can be made of steel, concrete, or masonry construction. They can provide a complete space frame throughout the building to carry vertical loads, and they can use some of those same frame elements to resist lateral forces. Lateral forces, can be resisted by the joints between columns and beams, and between the columns and the foundation. These joints can become highly stressed during seismic events.

The joints of moment-resistant frames resist lateral loads by their resistance to rotation. The columns, beams, and foundations between these joints are held rigid in relation to one another so that vertical and lateral loads are resisted by the bending strength in the beams and the columns. The strength of the columns and the beams are proportioned to prevent column failure by allowing permanent deformation in the beam prior to any column failure. The greatest demand on the columns occurs at and adjacent to the joints.

Moment-resistant frames are most often made of structural steel with bolted or welded joints, which provide a ductile structure that will distort prior to failure and if properly detailed will not fail in a brittle manner. These frames develop their resistance to lateral forces through the flexural strength and continuity of beam and column.

In the past most columns and beams have been "I" shaped members called wide flange sections. The top and bottom of the "I" section is the flange. Typically the beams frame into the columns at the flange, which is the strong axis direction of the section. The beam flanges are usually welded to the flange (s) of the column. This configuration gives the column-beam joint great strength in one direction. To provide the same strength in the other direction, at 90 degrees from the first direction, some columns in the structure must be rotated or loads must be resisted in the "weak axis" direction of the column. This would require a stronger column to resist weak axis loads and there are recommended configurations for weak axis column joints. Most small buildings require columns that must resist loads in each direction. This is a problem for "I" section columns in that much larger columns would be required to resist weak axis loads.

In contrast, Hollow Square Sections (HSS) have the same properties in each direction. Using hollow square tube sections for columns can make design and detailing the same in each direction and the same column can be used for moment resisting connections in each direction. However, the HSS column presents a challenge in another way from the typical "I" section column in making the moment-resisting connection between the beam and the column.

An acceptable moment-resisting beam column joint must remain rigid to the point of beam failure. Typically the Reduced Beam Section (RBS) is used to provide a fuse in the beam where failure occurs while the joint between the column and beam remains rigid. To accomplish this the joint must resist compression and tension forces produced by the bending in the beam at the beam flanges.

In the ongoing effort to improve building frame structure to better handle severe lateral loads, such as earthquake and high-wind loads, much attention has been focused on the manner in which upright columns and horizontal beams are connected. Attempts to addresses this issue include a column-beam interconnect with the ends of beams joined to columns using nodes of intersection and collar structures that surround the sides of the column as taught by Simmons et al. (U.S. Pat. No. 6,837,016). Other attempts include Okawa et al., (U.S. Pat. No. 5,410,847) who teaches a rod-like orthogonal metal connector provided in concrete structure members with junction hardware to connect a steel member to the structure member. Chen, (U.S. Pat. No. 5,595,040) teaches a beam-to-column connection for connecting an H-beam to a column surface, where the connection is defined at an end of the H-beam having a web plate and a pair of flange plates. Houghton (U.S. Pat. No. 6,138,427) teaches a moment resisting, beam-to-column connection, using two gusset plates attached to a column and extending along the sides of a beam and having connecting elements, where the connecting elements are bolted, riveted or welded to the beam along its longitudinal direction and to the gusset plates. Katayama et al. (U.S. Pat. No. 6,532,713) teaches a composite beam connected to a column by inserting a mortise pin into a bottom hole of a column and then inserting a locking pin into a through-hole of the mortise pin and the horizontal hole of the column such that joint of the composite beam and the column is firmly secured. Further, Briggs (U.S. Pat. No. 3,593,477) teaches a concrete beam reinforcement anchor embedded in the concrete, which has a plane surface in the side-face of the beam or column for bolting a beam thereto.

These and other designs and systems have been used to make this connection but they are considered costly, less flexible or impracticable to build.

What is needed is a low-cost simple to use moment-resistant building frame system that can be assembled in the field without welding and requires little or no field modifications to meet the rigorous building design codes for earthquake and wind prone environments.

SUMMARY OF THE INVENTION

A moment-resistant building column insert system incorporates a vertical building column with a foundation and structural beams positioned along the building column sides and top. The column insert improves building column strength and connection strength at foundations and at beams and uses bolted connections.

The column insert system can be filled with concrete, grout or dense foam to increase column strength and reduce local buckling of the column.

The moment-resistant building column insert system is a column insert that has similar and reduced cross-section shape to a building column shape. The column insert has a pattern of mounting holes through the walls that are similar to a pattern of mounting holes through the walls of a vertical building column, where the insert is positioned inside the column and the patterns of mounting holes are aligned. The column insert can fit into a building column frictionally, "slidably" or freely, where the column insert may then be fixedly attached to the column. Nut plate assemblies having a similar pattern of mounting holes with threaded nuts concentrically retained therein are inserted and aligned with the column mounting holes and welded inside the column insert. Steel I-beams are incorporated with endplates at the I-beam ends. The beam endplates have a similar pattern of mounting holes and are aligned to the building column pattern to abut the building column outer wall. The endplates can have optional lengths and geometry. Mounting bolts having washers are inserted through the endplate, building column, column insert and nut plate mounting holes then tightened to the threaded nuts retained in the nut plate assemblies. For cylindrical columns, the beam endplates and nut plate assemblies are of generally cylindrical-quadrant shape. Other regular and irregular column and matching-insert shapes can be constructed in like manner. End plates can be configured to provide a beam support for non-moment connections to the column. The beams supported by these non-moment connections are typically steel "I" beams or wood beams of rectangular cross section.

When using the moment-resistant building column insert system for incorporating roof beams to a building column top end or any beam to the top of a building column at any level, a top plate is transversely incorporated to the column insert top end or alternatively incorporated to the building column top end using welding means. Alternatively, the top plate may be incorporated to the column insert. The top plate may be integrated with the top flange of the I-beam using a second plate and bolting means. Alternatively, a column top plate may be incorporated to the column insert and the building column by welding without a second plate and a bolted connection to the top flange of the beam.

The moment-resistant building column insert system for use in incorporating building columns to foundations connects the building column bottom end to a building foundation where a top portion of the column insert is positioned in the building column and the bottom portion of the column insert is integrated to the foundation. The building column has a base plate incorporated near the column bottom end where the base plate is of generally planar-rectangle shape and having a building column port of similar rectangular shape for receiving the building column there through. The column base plate is incorporated transverse to the building column bottom end and has anchor bolt holes arranged in a pattern along the perimeter for receiving a plurality of threaded anchor bolts.

The column insert is integrated to the foundation using a series of insert plates and anchor bolts, where the insert plates are transversely incorporated to the column insert and have anchor bolt holes arranged in a pattern similar to the base plate hole pattern along the perimeter. The insert plates are incorporated along and beneath the column insert using the anchor bolts and threaded positioning nuts along the anchor bolt lengths or by welding means.

The concrete foundation is integrated with column insert, column insert plates and anchor bolts, using concrete vibrating means before hardening. A mortar base may be integrated with the column bottom end, column base plate, anchor bolts and foundation. A plurality of threaded anchor nuts having washers are tightened to the anchor bolts, inserted through the base plate anchor bolt holes, to fixedly secure the base plate and building column to the concrete foundation holding the moment-resistant building column insert system.

The moment-resistant building column insert system may be used to connect a building column splice for extending a building column length. A lower column and an upper column receive the column insert about symmetrically there between, where the column insert is shop-welded in advance to the lower column to provide a pattern of column insert mounting holes above the lower column splice end for receiving mounting bolts when the upper column is positioned over the column insert and the column mounting holes are coaxially aligning with the pattern of column insert mounting holes.

The moment-resistant building column insert system resists the compression and tension forces from the beam flanges to the column by transferring beam bending forces to the walls of the column and column insert that are perpendicular to the beam endplate or parallel to the beam web. Extending the insert beyond the top and bottom of the beam endplates avoids stress risers that cause cracks and local failures. For tension loads the I-beam and endplate transfer the load to the bolts, nut plate assemblies, column insert and building column. The tension is transferred to the sides of the building column and column insert by bending and/or by a compression strut at the corner of the column face and sides. The exact mechanism depends on the thickness of the column, insert, nut plate, end plates and bolt patterns.

The moment-resistant building column insert system does not require any special tooling, setup or machining. No field welding is required and the mounting bolts can all be installed at the time of initial erection to provide enough strength to allow continued erection of other steel columns and beams.

Where the building column is wider than the beam flanges, a stiffener plate may be needed along the top and bottom flange of the beam at the endplate.

BRIEF DESCRIPTION OF THE DRAWINGS

FIGS. 11a, 11b and 11c depict planar cutaway views of an embodiment of the moment-resistant building column insert system and elements at the column base.

DETAILED DESCRIPTION

Figure 1:
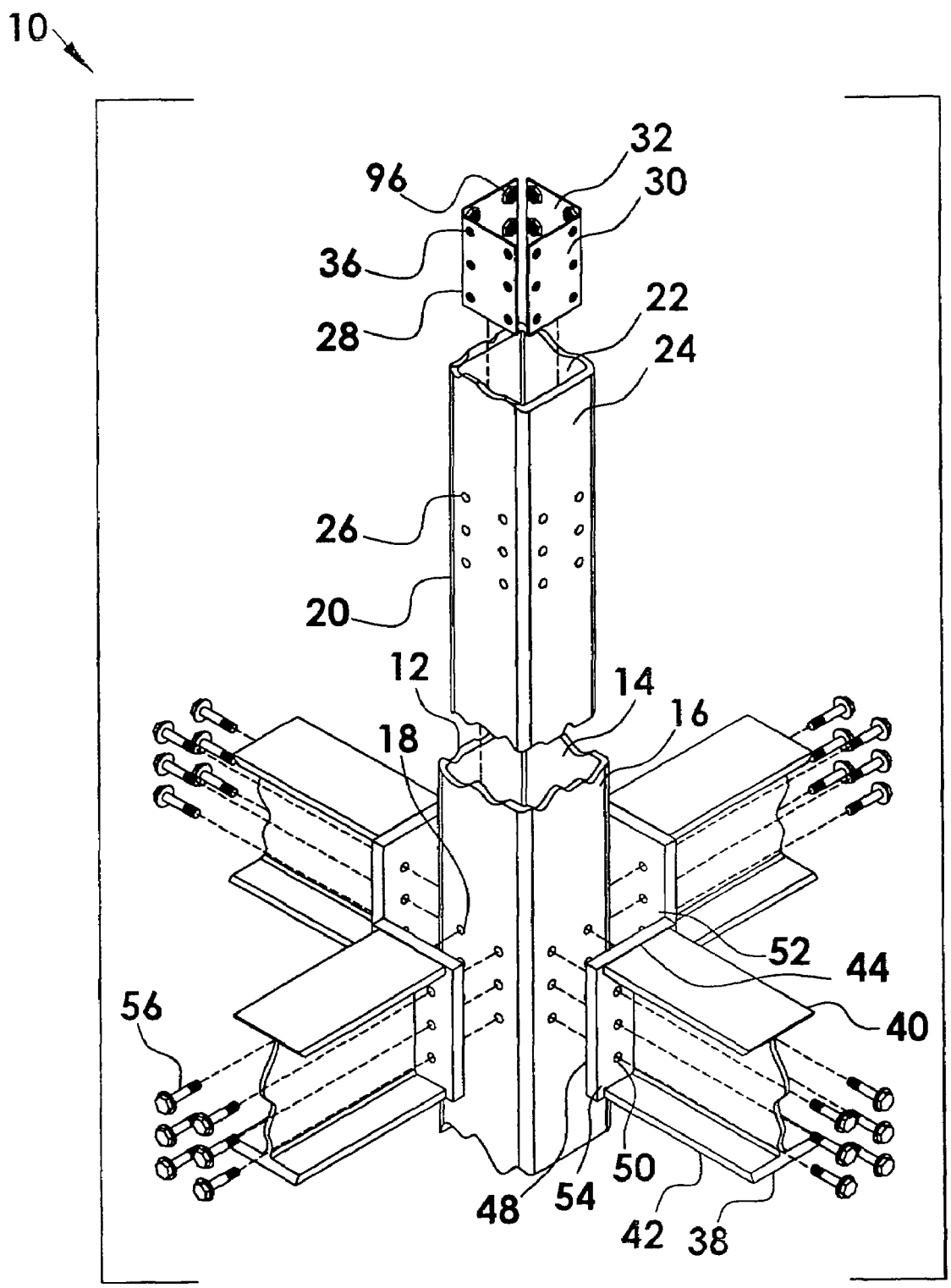
FIG. 1 depicts a perspective exploded view of a moment-resistant building column insert system according to one embodiment of the current invention.

Described here is a novel moment-resistant building column insert system for distributing lateral and vertical loads between the column-beam and column-foundation connections. The benefits provided by this system are non-welded field connections using bolted connection only. This moment-resistant building column insert system provides strengthening at each level comprising roofs, mid-levels and foundations, where this strengthening is bidirectional and multi-directional.

Loads are distributed between the building column and beam using a column insert, nut plate assemblies and column plates incorporated to I-beam-ends. The column insert is hollow and of similar cross-section shape to the building column for inserting thereto. The building column, column insert, nut plate assemblies and endplates have patterns of mounting holes for receiving mounting bolts tightened to nuts held by nut plate assemblies. Loads are distributed between the column and foundation using a base plate, column insert, and insert plates integrated with anchor bolts, nuts and washers in a concrete foundation. The base plate having mounting holes is incorporated to the building column bottom end to receive the plurality of anchor bolts there through for fixedly tightening as an exposed end of the column insert fits in the column.

The moment-resistant building column insert system incorporates a vertical building column with structural beams along the building column sides and top end, and with a foundation at the bottom end to improve building column strength at a connection. The building column can be of generally hollow rectangular, hollow circular or polygon cross-section having inner walls and outer walls, wherein a plurality of transverse mounting holes exist in a pattern through the building column walls. The moment-resistant building column insert system and the building column can be filled with concrete, grout, or dense foam to increase column strength and reduce local buckling of the column.

The moment-resistant building column insert system uses a column insert having a reduced cross-section that is similar to the building column cross-section and has inner walls and outer walls with a plurality of transverse mounting holes arranged in a pattern similar to the mounting hole pattern in the building column through the column insert walls. The column insert mounting holes are concentrically aligned with the building column mounting holes when the column insert is placed inside the building column.

The column insert top end integrates with a top plate for use with roof beams, the column insert walls interface along the building column walls for use with I-beams, while the column insert bottom end integrates with a plurality of base plates using anchor bolts for use with foundations. The column insert outer walls are sized to fit into the building column inner walls either frictionally, slidably or freely to desirably position the insert within the column. The insert may then be welded or connected fixedly to the column using attachment means such as nuts and bolts, shot pins or screws.

Steel I-beams having a cross section height spanning from an I-beam top flange surface to an I-beam bottom flange surface are incorporated to building columns using endplates of generally rectangular shape that are incorporated to the I-beam ends. One side of the endplate abuts the I-beam end and another side abuts a building column outer wall. Beam support end plates, similar to end plates described above, can be configured to provide a beam support for non-moment connections to the column. The beams supported by these non-moment connections may be steel "I" beams or wood beams of rectangular cross section.

The endplates have a plurality of mounting holes there through arranged in a pattern similar to the building column mounting hole pattern and are aligned with the building column mounting holes, where the endplate width is about the width of the I-beam cross section width and the endplate height is about the height of the I-beam cross section height. Alternatively to provide additional strength or for use in special applications, the endplate may extend up to 24-inches beyond the I-beam top flange and up to 24-inches beyond I-beam bottom flange and may have a plurality of mounting holes in a pattern there through for aligning coaxially with the building column mounting holes. Further, reinforcing plate(s) can be added on face(s) of the column by welding means. In these extended applications, the column insert may also be extended accordingly. For cylindrical columns, the beam endplates are of generally cylindrical-quadrant shape having a concave side for abutting the column outer surface and a convex side for incorporating to the I-beam ends.

When using the moment-resistant building column insert system with a non-moment connection, a pair of gusset plates holding a bracket plate is incorporated to the endplate. The bracket plate is of generally rectangular shape and the gusset plates of generally triangular shape are incorporated perpendicular to the beam endplate, where the bracket plate is incorporated perpendicularly between the gusset plates and perpendicular to the endplate having a pattern of bracket plate mounting holes there through. The I-beam bottom flange surface has a pattern of holes similar to the bracket plate hole pattern, where the patterns are aligned when the I-beam bottom flange surface rests on the bracket plate. A plurality of bracket plate mounting bolts are inserted through the patterns of holes and tightened to a plurality of threaded nuts having washers there between. Alternatively, the beam may be a wood beam of generally rectangular cross section, wherein a similar pattern of lag screw holes exist transversely in the wood beam bottom surface for aligning with the pattern of bracket plate mounting holes for receiving a plurality of wood lag screws and tightened therein.

Nut plate assemblies of generally rectangular planar shape and about the size of the beam endplates have a plurality of nut plate mounting holes there through arranged in a pattern similar to the building column mounting hole pattern, and are aligned with the column insert mounting holes, where the nut plate assembly abuts the column insert inner wall and the hole pattern are aligned concentrically. For cylindrical columns, the nut plate assemblies are of generally cylindrical-quadrant shape having a convex side for abutting the column insert inner surface. Mounting bolts having washers are inserted through the mounting holes of the endplates, building column, column insert and the nut plate assemblies and rotatably tightened to the threaded nuts held by the nut plate assemblies.

When using the moment-resistant building column insert system for incorporating roof beams to a building column, a top plate is transversely incorporated to the column insert top end or alternatively incorporated to the building column top end using welding means. Alternatively, the top plate may be incorporated to the column insert top end using a top insert plate that is integrated to the bottom surface of the top plate for slidably, frictionally or freely inserting to the column insert top end, where the top insert plate may be bolted or welded to the top plate bottom surface. The top plate integrates with the roof beam, and the roof beam has endplates for engaging the moment-resistant building column insert system in a manner as described above.

The top plate for use with the moment-resistant building column insert system has a plurality of top plate extensions with a pattern of top plate mounting holes there through. Roof beams having a similar pattern of top flange mounting holes there through are aligned with the top plate mounting holes for receiving a plurality of top plate mounting bolts having washers there through and tightened to a plurality of threaded nuts. The top plate extensions may be in any arrangement and preferably in a cross-pattern, an L-pattern, a T-pattern, a linear pattern or a single extension, where the cross-pattern is for incorporating four roof beams, the L-pattern is for incorporating two roof beams at a right angle, the T-pattern is for incorporating three roof beams and the linear pattern is for incorporating two roof beams in series or a single roof beam to the column top.

The moment-resistant building column insert system may be used to connect a building column splice for extending a building column length. A lower column and an upper column receive the column insert about symmetrically there between, where the column insert is shop-welded in advance to the lower column to provide a pattern of column insert mounting holes above the lower column splice end for receiving mounting bolts when the upper column is positioned over the column insert and the column mounting holes are coaxially aligning with the pattern of column insert mounting holes.

The moment-resistant building column insert system resists the compression and tension forces from the I-beam flanges to the building column by transferring I-beam bending forces to the walls of the building column and column insert that are perpendicular to the I-beam endplate or parallel to the I-beam web. In some cases the forces on the flange of the I-beam with the endplate will span from one side of the column to the other side of the column under compressive loads. This compression transfers force to the sides of the column and insert directly. The sides of the building column are the strongest and stiffest elements of the column. The column insert and insert sides also supply more strength and stiffness to resist the compression forces of the beam flanges. Extending the column insert beyond the point of contact with the I-beam flange and endplate spreads the compression load and avoids stress risers that cause cracks and local failures. For tension loads the I-beam flange transfers the load to the endplate and the endplate transfers the load to the bolts. The bolts transfer the load to the nut plate assemblies, column insert and building column. The tension from the bolt is transferred to the sides of the building column and the sides of the column insert by bending and/or by a compression strut at the corner of the column face and sides. The exact mechanism will depend on the thickness of the various elements (column, insert, nut plate assembly, and exterior reinforcing plates), the number and placement of the bolts.

The moment-resistant building column insert system for use in incorporating building columns to foundations connects a vertical building column bottom end to a building foundation where a top portion of the column insert is positioned in the building column and the bottom portion of the column insert is integrated to the foundation. The building column has a base plate incorporated near the column bottom end where the base plate is of generally planar-rectangle shape and having a building column port of similar rectangular shape for receiving the building column there through. The column base plate is incorporated transverse to the building column near bottom end, where a portion of the building column extends beneath the base plate to allow welding between the column and the base plate on each side of the base plate. The base plate has anchor bolt holes there through arranged in a pattern along the perimeter for receiving a plurality of threaded anchor bolts there through.

The column insert is integrated to the foundation using a series of insert plates and anchor bolts having washers, where the insert plates are transversely incorporated to the column insert length and have a plurality of anchor bolt holes there through arranged in a pattern similar to the base plate hole pattern along the perimeter. The insert plates have a column insert port of a rectangular shape similar to the column insert there through for receiving the column insert therein, and a bottom insert plate is positioned beneath the column insert bottom end. The insert plates are incorporated along and beneath the column insert bottom end using the plurality of anchor bolts having a plurality of threaded positioning nuts along the anchor bolt lengths. The plates may alternatively be positioned by connecting the insert plates to the anchor bolts and/or column insert at desired positions beneath the insert bottom end by welding or other means.

The concrete foundation is integrated with column insert, column insert plates and anchor bolts having washers, using concrete vibrating means before hardening. A mortar base may be integrated with the column bottom end, column base plate, anchor bolts and foundation. A plurality of threaded anchor nuts having washers are tightened to the anchor bolts inserted through the base plate anchor bolt holes to fixedly secure the base plate and building column to the concrete foundation and moment-resistant building column insert system.

The moment-resistant building column insert system does not require any special setup or machining. No field welding is required and the bolts can all be installed at the time of initial erection to provide enough strength to allow continued erection of other steel columns and beams without delays. Where the building column is wider than the beam flanges, a stiffener plate may be needed along the top and bottom flange of the beam at the endplate.

The steps of using a moment-resistant building column insert system comprise creating a plurality patterns of mounting holes in a building column and similar patterns in the column insert for receiving a plurality of mounting bolts there through. The column insert is positioned in the building column to align the column insert mounting holes concentric to the building column mounting holes. A plurality of nut plate assemblies are positioned on the column insert inside surface with the nut plate mounting holes are coaxially aligned with the column insert mounting holes. A plurality of endplate are incorporated to an a plurality of ends of I-beams using welding means, where the end plates have a plurality of mounting holes there through arranged in a pattern similar to the building column pattern, where the endplate mounting holes are positioned coaxially to the building column mounting holes for receiving a plurality of mounting bolts there through such that the mounting bolts are inserted through the mounting holes of the endplate, building column, column insert, and nut plate assembly holes then rotated into the mounting nuts for fixedly securing the I-beam to column to create one embodiment of the moment-resistant building column insert system.

The steps of using one embodiment of the moment-resistant building column insert system with a foundation comprise welding a base plate transverse to a building column bottom end, wherein the base plate is of generally planar-rectangle shape having a building column port of generally rectangular similar to the building column for receiving the building column bottom end there through. The base plate is formed with a plurality of anchor bolt mounting holes in a pattern along the perimeter there through. A column insert is integrated to the foundation using a series of insert plates and anchor bolts having washers, where the insert plates are formed with anchor bolt holes arranged in a pattern along the perimeter similar to the base plate hole pattern. The insert plates are transversely integrated to the column insert, where the insert plates are made to have a column insert port of a rectangular shape similar to the column insert there through for receiving the column insert therein. The insert plates are welded to the column insert, and welded to the anchor bolts or the insert plates may be positioned along the anchor bolts using threaded positioning nuts. A bottom insert plate of similar shape and form to the insert plates is positioned beneath the column insert bottom end and integrated to the anchor bolts.

The concrete foundation is integrated before hardening with the column insert, column insert plates and anchor bolts having washers typically by vibrating means, where the anchor bolt threaded ends and a portion of the top half of the column insert is desirably positioned above the concrete surface. The base plate and building column are positioned on the column insert and anchor bolts to rest on positioning nuts desirably positioned on the anchor bolts and to rest on a mortar base and/or on the foundation placed after positioning the column. A plurality of threaded anchor nuts having washers are tightened to the anchor bolts to fixedly secure and position the base plate and building column to the concrete foundation to create one embodiment of the moment-resistant building column insert system. The building column and column insert may be filled with concrete and/or grout for added strength.

Referring now to the drawings, where FIG. 1 depicts a perspective exploded view of a moment-resistant building column insert system 10 according to one embodiment of the current invention. Shown is a building column 12 having a column inner surface 14, a column outer surface 16 and a plurality of column mounting holes 18 arranged in a pattern there through, where the column top and bottom are depicted as cut away for illustrative purposes. The building column 12 can be single story or multistory, where the highest load on the column beam connection typically occurs below the highest level of a multistory building. In FIG. 1 a rectangular column is depicted, however the principles described herein apply to cylindrical or polygon columns.

A column insert 20 is shown having an insert inner surface 22, an insert outer surface 24, and a plurality of insert mounting holes 26 there through arranged in a pattern similar to the building column mounting holes 18, where the column insert 20 is inserted in the building column 12 such that the column insert outer surface 24 faces the building column inner surface 14. The column insert outer surface 24 is smaller than the building column inner surface 14 and of similar cross section such that the column insert 20 may slidably, frictionally or freely fit inside the column. The column insert 20 may then be welded or connected fixedly to the column 12 using attachment means such as nuts and bolts, shot pins or screws.

Figure 8A:
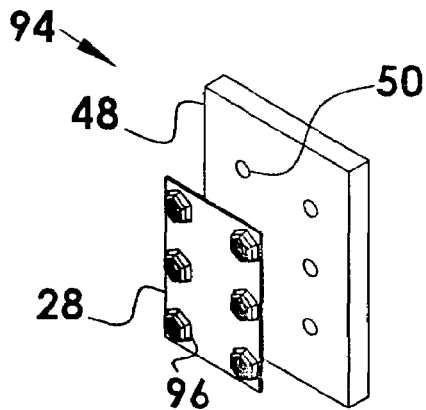
FIGS. 8a-8f depict perspective views of nut plate assemblies matched with endplates and different nut plate assemblies.
Figure 8B:
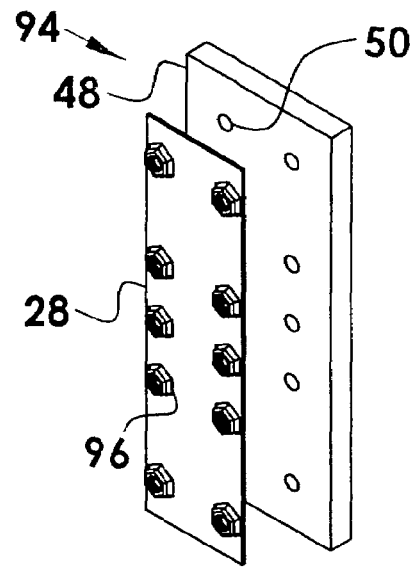
Figure 8C:
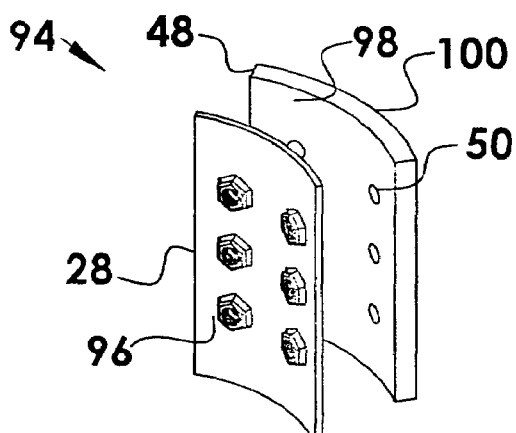
Figure 8D:
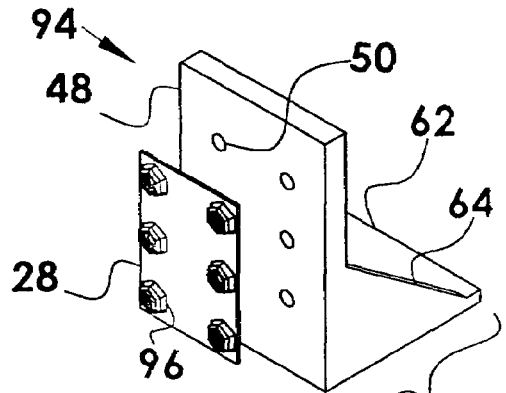
Figure 8E:
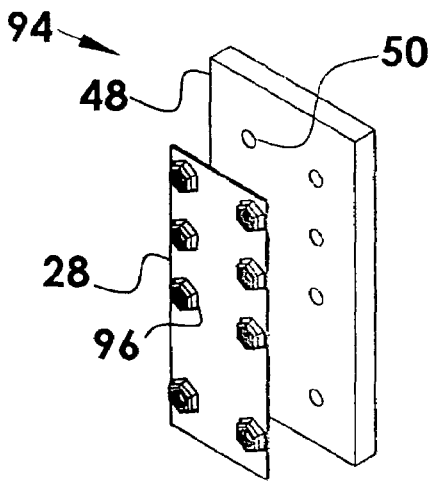
Figure 8F:
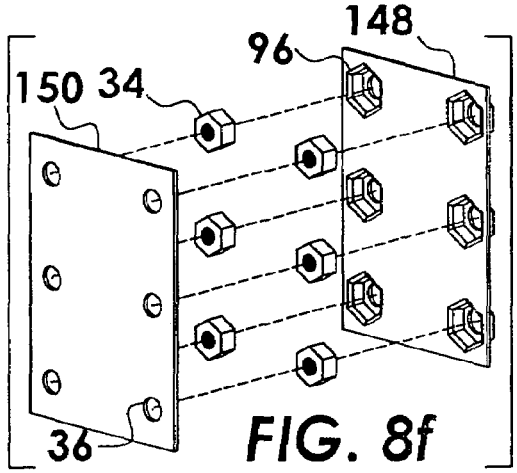

A plurality of nut plate assemblies 28 are shown having a nut plate first surface 30 and a nut plate second surface 32 with a means of fixedly holding a plurality of threaded nuts 34 (not shown) held in nut pockets 96 (see FIG. 8f) coaxially aligned with nut plate mounting holes 36 there through arranged in a pattern similar to the building column mounting holes 18, where the threaded nuts 34 (not shown) are depicted to be fixedly held by nut pockets 96 (see FIG. 8f). The nut plate assemblies 28 are inserted to the column insert inner walls 22 and the pattern of nut plate mounting holes 36 are aligned with the patterns of column mounting holes 26, where the nut plate assemblies 28 may then be welded in place (not shown).

A plurality of I-beams 38 are depicted having an I-beam top flange 40, an I-beam bottom flange 42, an I-beam first end 44 and an I-beam second end 46 (not shown), where the I-beam second end is depicted as cutaway for illustrative purposes. The I-beam first end 44 is depicted having an end-plate 48 incorporated normal to the I-beam flanges (40, 42). The American Institute of Steel Construction (AISC) has two guideline documents (Design Guideline 4 & Design Guideline 16) for the design of endplates on beams, where these guidelines are incorporated to the aspects of the current invention. The endplate 48 has a pattern of endplate mounting holes 50 there through. The endplates 48 are fixed to the I-beam ends using welding means (not shown), where the endplates 48 have an endplate first surface 52 for abutting the building column outer surface 16 and an endplate second surface 54 for incorporating to the I-beam first end 44.

A plurality of high strength mounting bolts 56 having washers that may be DTI washers are inserted through patterns of endplate mounting holes 50, building column mounting holes 18, column insert mounting holes 26, nut plate mounting holes 36 and into the threaded nuts 34 (not shown), where the mounting bolt 56 is rotated securely into the threaded nut 34 (not shown) for enabling a moment-resistant joint between the I-beam 38 and the building column 12. This connection can be made on all four sides of the building column 12 or any combination of one or more sides of the building column 12.

Reduced beam sections can be used on the I-beams 38 to relocate the plastic hinge away from the beam column joint, where a reduced beam section is a narrow flange region that will be weaker than the remainder of the I-beam.

The moment-resistant building column insert system 10 can accommodate a larger number of combinations because it can be made in different lengths and thickness having thick or thin nut plate assemblies 28 and different size nuts 34 (not shown) and mounting bolts 56, and endplates 48 with added exterior reinforcing The column inserts 20 can be fabricated for use with standard hollow square section (HSS) tube sections, where no special equipment or milling is required. Once the building columns 12 are assembled with the column inserts 20 and erected on site, standard endplate-beams can be simply bolted to building columns 12, using industry standard high strength mounting bolts 56. After the building column 12 is positioned in the field, the I-beams 38 and endplates 48 having endplate mounting holes 50 are aligned with the building column mounting holes 18, where the mounting bolts 56 are inserted and tightened to the threaded nuts 34 (not shown).

Figure 2:
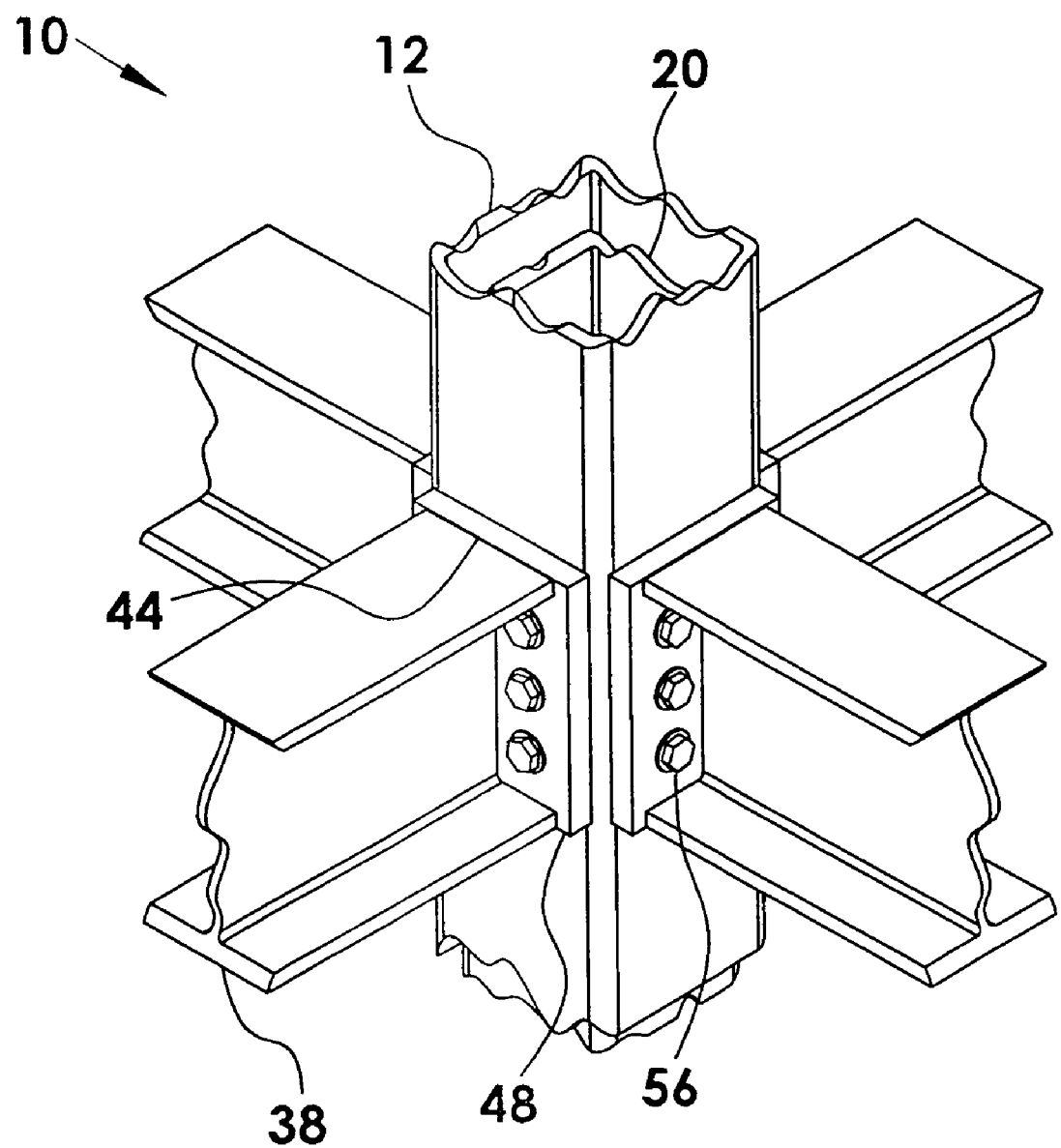
FIG. 2 depicts a perspective partial cutaway view of one embodiment of the moment-resistant building column insert system of FIG. 1.

FIG. 2 depicts an assembled perspective partial cutaway view of the moment-resistant building column insert system 10 of FIG. 1, where shown are the plurality of I-beams 38 having the plurality of endplates 48 incorporated to the I-beam first end 44 using welding means (not shown). Further illustrated are the mounting bolts 56 fixedly attached, where it is not shown but understood that the mounting bolts 56 are inserted to the hole patterns in the endplate 48, column 12, column insert 20, nut plate assemblies 28 and rotatably tightened to the threaded nuts 34 (not shown) held or fixed to the nut plate assemblies 28.

Figure 3A:
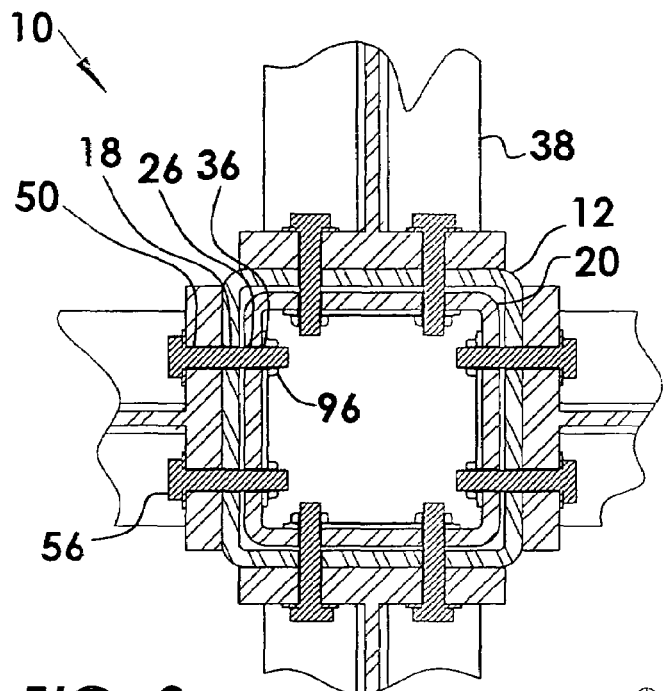
FIGS. 3a and 3b depict planar top cutaway views of rectangular and circular column embodiments of the insert systems.
Figure 3B:
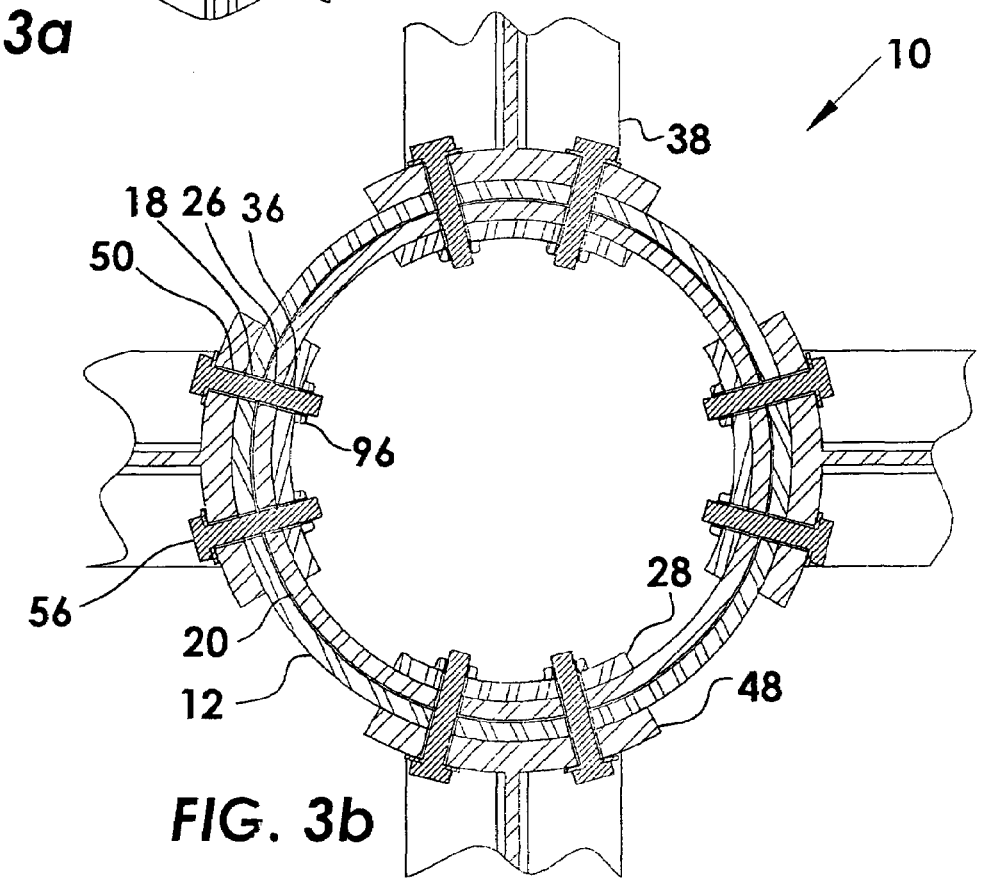

FIGS. 3a and 3b depict planar top cutaway views of rectangular and cylindrical moment-resistant column insert systems 10, respectively. In FIG. 3a, the rectangular column insert 20 is shown inserted to the rectangular building column 12, where mounting bolts 56 having washers are inserted through the endplate mounting holes 50, building column mounting holes 18, column insert mounting holes 26 and nut plate assembly mounting holes 36, then rotatably tightened to the threaded nuts 34 (not shown). The nuts 34 (see FIG. 8f) are held within the nut pockets 96 for holding the nuts 34 (see FIG. 8f) coaxially aligned with the nut plate mounting holes 36 on the nut plate assemblies 28. Shown here is a plurality of thin nut plate assemblies 28 according to one embodiment of the current invention.

FIG. 3b depicts a cylindrical moment-resistant column insert system 10 having a cylindrical column insert 20 fitted into a cylindrical building column 12 with mounting bolts 56 having washers inserted sequentially through the endplates mounting holes 50, building column mounting holes 18, column insert mounting holes 26 and nut plate assembly mounting holes 36, then rotatably tightened to the threaded nuts 34 (see FIG. 8f), where the nuts 34 are depicted as being held in nut pockets 96 (see FIG. 8f) to fixedly secure them coaxially aligned with the nut plate mounting holes 36. Shown here are endplates 48 and nut plate assemblies 28 having a cylindrical-quadrant shape where the nut plate assemblies 28 are depicted having greater thickness with extended mounting bolts 56 having washers according to one embodiment of the current invention.

Figure 4A:
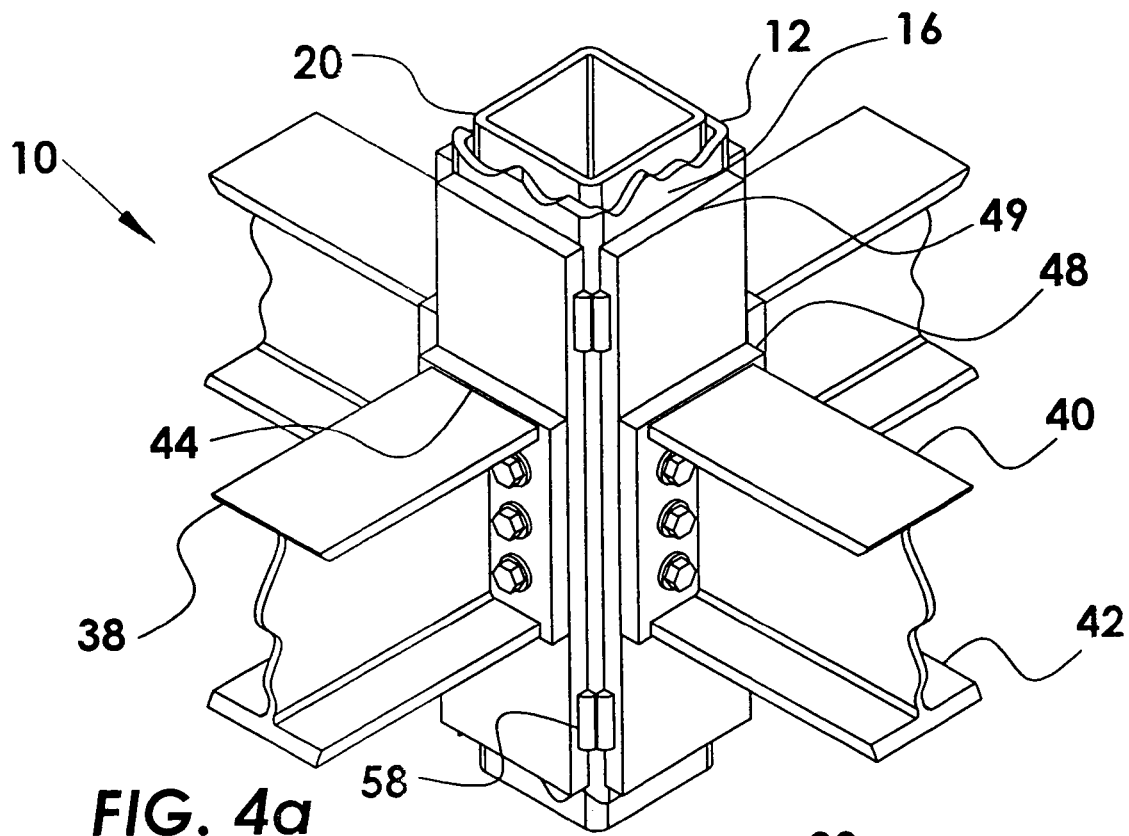
FIGS. 4a and 4b depict perspective partial cutaway views of embodiments of the moment-resistant building column insert systems having extended endplates and reinforcing plates, respectively.
Figure 4B:
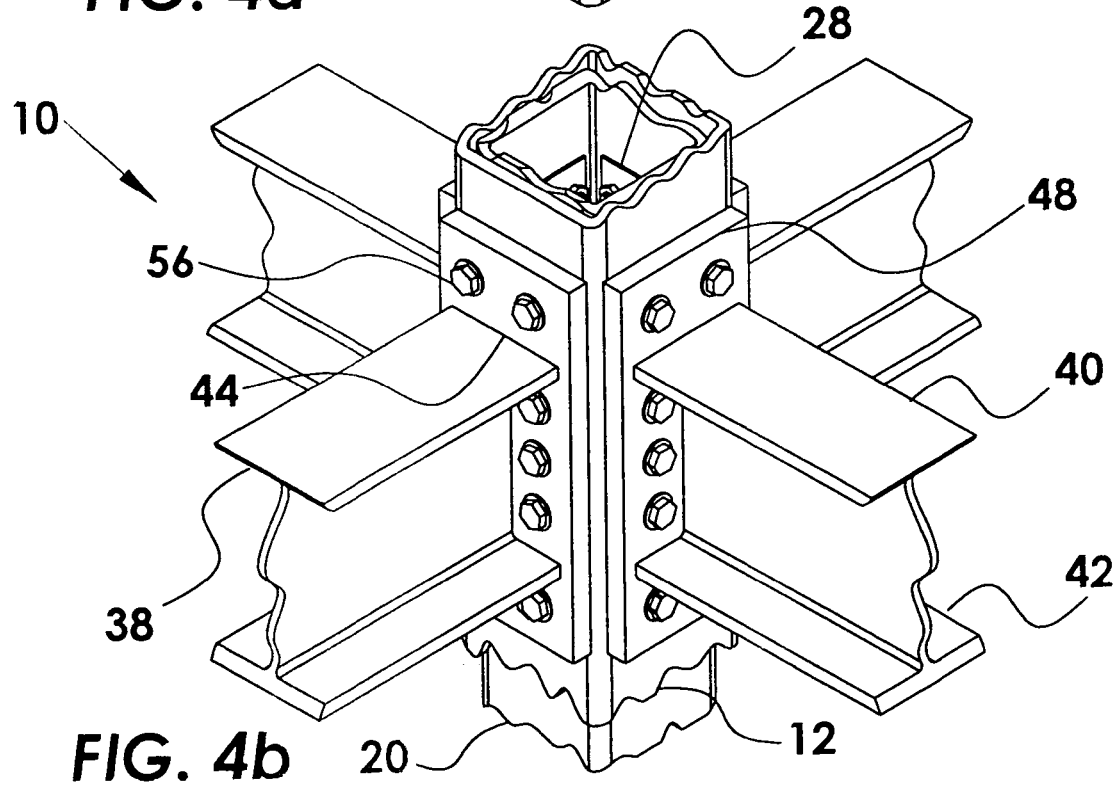

FIGS. 4a and 4b depict perspective partial cutaway views of moment-resistant building column insert systems 10 having reinforcing plates 49 and endplates 48. Shown in FIG. 4a are reinforcing plates 49 extending above and below the endplates 48 incorporated to I-beam ends 44, where the reinforcing plates 49 extend above the I-beam top flange 40 and below the I-beam bottom flange 42. Here, the reinforcing plate 49 is shop welded to the column 12 to provide more reinforcing for the column 12 typically in one direction in place of a larger column 12 or in place of a rectangular full-height column 12. An I-beam with a flush or extended end plate 48 is installed on top of the reinforcing plate 49, where the reinforcing plate 49 has a similar pattern of mounting holes (not shown) for aligning with the patterns of holes in the column 12, insert 20 and nut plate assembly 28 for receiving mounting bolts 56 there through. Here, FIG. 4a depicts a flush endplate 48 about the size of the cross-section of an I-beam 38, where it is understood that other sizes of endplates 48 may be used with or without the reinforcing plates 49. The reinforcing plates 49 are shop welded 58 to the building column outer surface 16. Further depicted is the column insert 20 extending beyond the I-beam flanges (40, 42), where extending the insert 20 beyond the point of contact with the I-beam flanges (40, 42) spreads the compression load and avoids stress risers that cause cracks and local failures.

Shown in FIG. 4b are extended endplates 48 incorporated to the I-beam ends 44, where the endplates 48 extend above and below the I-beam flanges (40, 42). As depicted, the extended endplates 48 use mounting bolts 56 having washers are bolted to extended nut plate assemblies 28, where the top and bottom ends of the column insert 20 are depicted as cut away and shown extending beyond the extended endplates to spread compression loads. For tension loads the I-beam flanges (40, 42) transfer the load to the endplates 48 and the endplates 48 transfer the loads to the mounting bolts 56. The mounting bolts 56 transfer the tension loads to the nut plate assemblies 28, column insert 20 and building column 12. The tension from the mounting bolt 56 is transferred to the sides of the building column 12 and the sides of the column insert 20 by bending and/or by a compression strut at the corner of the insert column 20 and building column 12 face and sides.

Figure 5A:
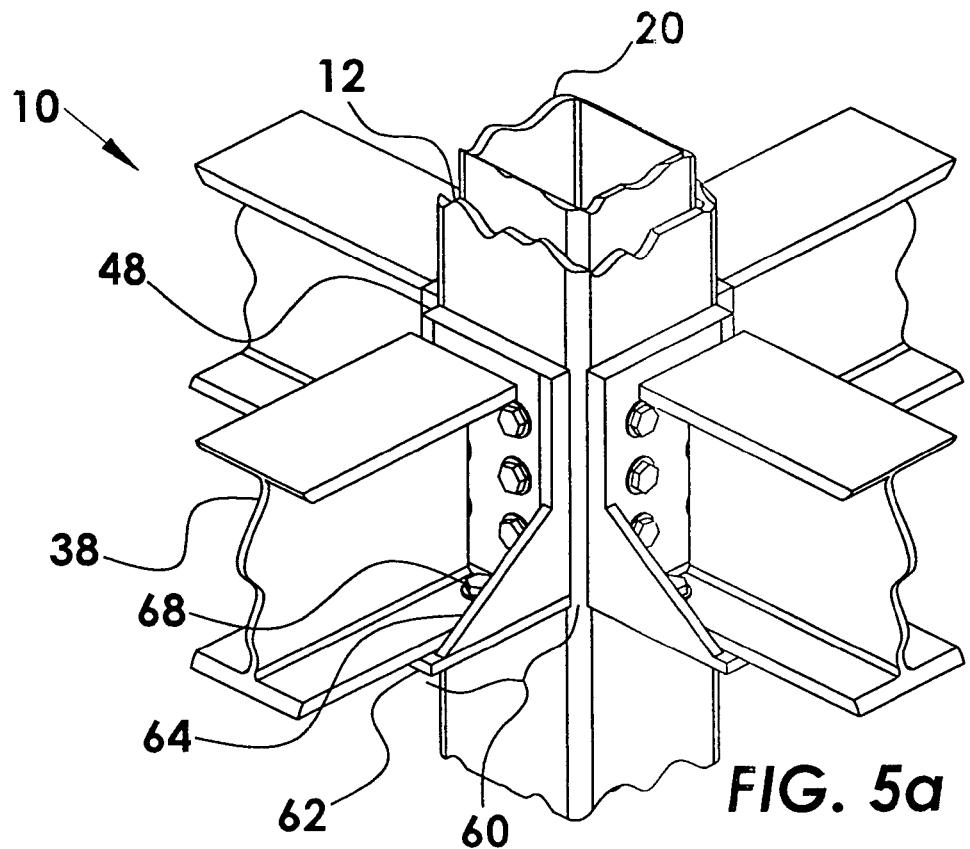
FIGS. 5a and 5b depict perspective and planar partial cutaway views of embodiments of the moment-resistant building column insert system having moment and non-moment connections.
Figure 5B:
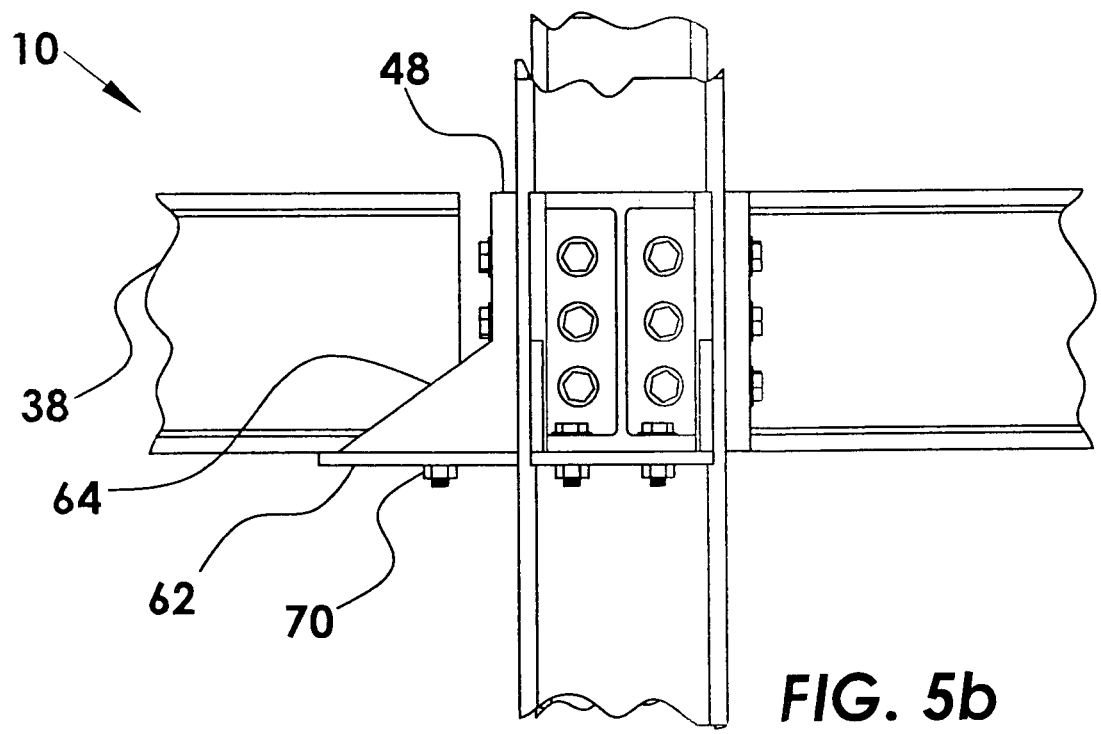

Referring to both FIGS. 5a and 5b, where depicted are perspective and planar partial cutaway views of a moment-resistant building column insert system 10 having moment and non-moment connections, where the non-moment connections do not influence the connection on the other side of the column 12. Shown is an endplate 48 having a height similar to the height of the I-beam flanges (40, 42), where the endplate 48 is bolted to the building column 12, column insert 20 and nut plate assembly 28 (not shown).

A non-moment connection comprises an angle bracket 60 attached to an endplate 48, where the angle bracket 60 comprises a bracket plate 62 of generally rectangular shape and a pair of gusset plates 64 of generally triangular shape incorporated perpendicular to the endplate 48. The bracket plate 62 is incorporated perpendicularly between the gusset plates 64 and perpendicular to the endplate 48, where the bracket plate 62 has a pattern of bracket plate mounting holes 66 there through (not shown) for aligning with a similar pattern of mounting holes through the I-beam bottom flange 42 (not shown) when the I-beam bottom flange 42 rests on the bracket plate 62. A plurality of bracket plate mounting bolts 68 having washers are inserted through the patterns of holes and tightened to a plurality of threaded bracket nuts 70 having washers there between. Alternatively, the I-beam 38 may be a wood beam (not shown) of generally rectangular cross section, wherein a similar pattern of lag screw holes are made transversely in the wood beam bottom surface for aligning with the pattern of bracket plate mounting holes 66 (not shown) for receiving a plurality of wood lag screws and tightened therein.

Figure 6A:
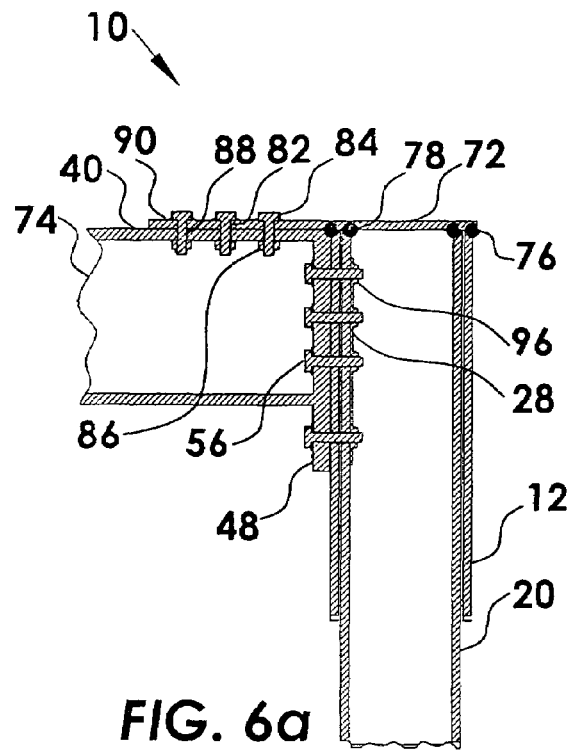
FIGS. 6a-6c depict planar cutaway views of top plates secured to embodiments of the moment resistant building column insert systems.
Figure 6B:
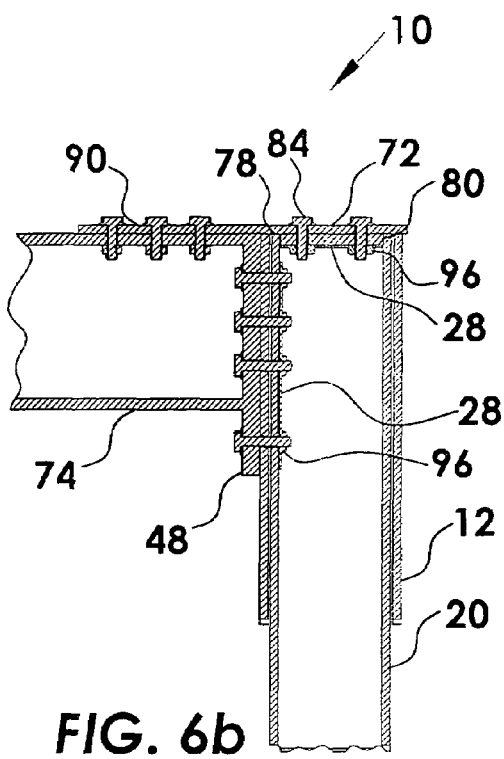
Figure 6C:
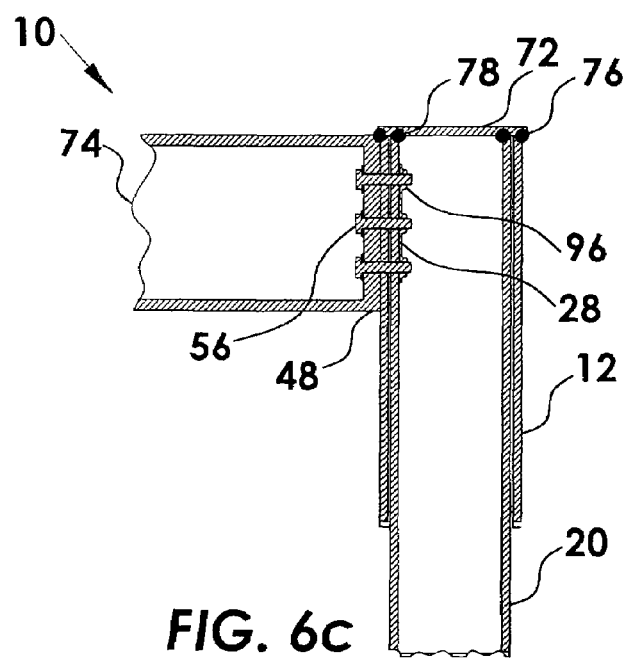

Referring to FIGS. 6a, 6b and 6c that depict planar cutaway views of moment-resistant building column insert systems 10 having top plates 72 for use with roof beams 74 and the like. When using the moment-resistant building column insert system 10 for incorporating roof beams 74 to a building column 12, a top plate 72 may be transversely incorporated to the building column top end 76 or alternatively incorporated to the column insert top end 78 using shop welding means depicted at the ends (76, 78). FIG. 6a shows a top plate 72 shop welded to the building column top end 76 and to the column insert top end 78, where it is understood that the top plate 72 could be shop welded independently to either the building column top end 76 or the column insert top end 76.

Alternatively, depicted in FIG. 6b, the top plate 72 may be incorporated to the column insert top end 78 using a top insert plate 80 that is bolted to the bottom surface of the top plate 72 and inserting into the column insert inner walls 22, where the top insert plate 80 may be bolted using a nut plate assembly 28 having nut pockets 96 as shown, or may be shop welded (not shown) to the bottom side of the top plate 72. FIGS. 6a and 6b further depict the top plate 72 having a plurality of top plate mounting bolts 84 having washers inserted through top plate mounting holes 82 there through arranged in a pattern for aligning with a plurality of I-beam top flange mounting holes 88 there through arranged in a similar pattern as the top plate mounting holes 82, and tightened to a plurality of threaded top plate nuts 86. The endplate 48 is bolted to the building column 12, column insert 20 and nut plate assembly 28 in the manner described above.

FIG. 6c depicts a moment-resistant building column insert system 10 having top plates 72 for use with roof beams 74 in a light connection, where depicted are top plate shop welds to either the building column top end 76 or the column insert top end 78 having an endplate 48 that is flush with the I-beam flanges (40, 42) and having a plurality of mounting bolts 56 inserted through patterns of holes through the building column 12, column insert 20 and nut plate assembly 28 and tightened to threaded nuts 34 (see FIG. 8f) held within the nut pocket 96.

Figure 7A:
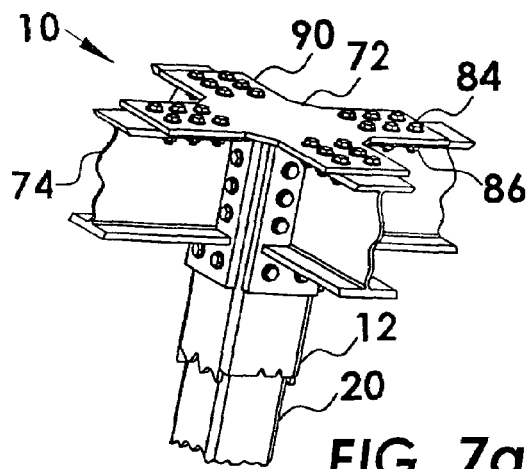
FIGS. 7a-7f depict perspective cutaway views of embodiments of the moment-resistant building column insert system having top plate assemblies.
Figure 7B:
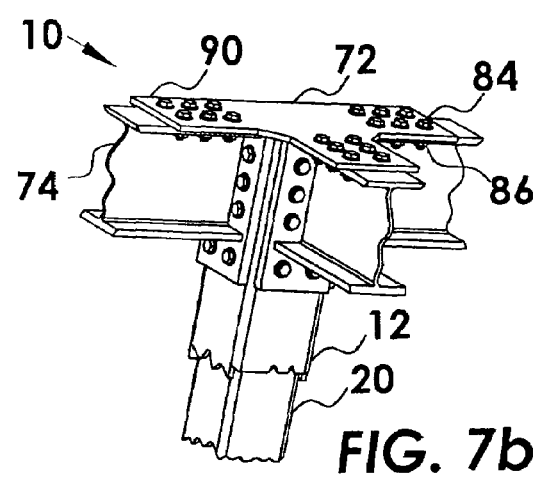
Figure 7C:
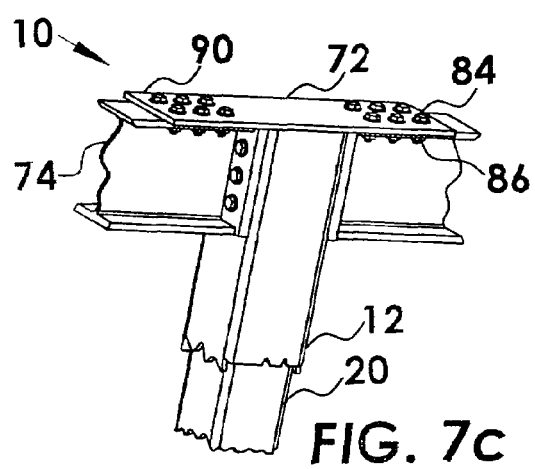
Figure 7D:
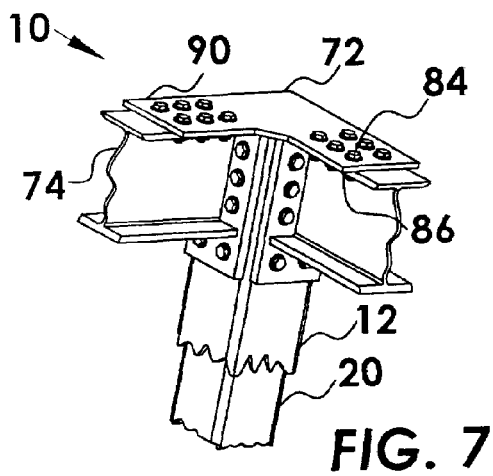

FIGS. 7a-7f depict perspective views of moment-resistant building column insert systems 10 having top plates 72. FIGS. 7a-7d show a top plate 72 having a plurality of top plate extensions 90 with a pattern of top plate mounting holes 82 (not shown) there through, where the roof or single story beams 74 have a similar pattern of top flange mounting holes 92 (not shown) there through and are aligned with the top plate mounting holes 82 (not shown) for receiving a plurality of top plate mounting bolts 84 having washers and tightened to a plurality of threaded top plate nuts 86. It is understood that the depicted top plate mounting bolts 84 in a pattern are though the aforementioned top plate holes 82 and flange holes 92. The top plate extensions 90 may be in a cross-pattern as in FIG. 7a, a T-pattern as in FIG. 7b, a linear pattern as in FIG. 7c, or an L-pattern as in FIG. 7d where the cross-pattern is for incorporating four roof or single story beams 74, the L-pattern is for incorporating two roof or single story beams 74 at about a right angle, the T-pattern is for incorporating three roof or single story beams 74 and the linear pattern is for incorporating two beams 74 in series or a single roof or single story beam 74 to the building column top 76. FIG. 7c further depicts a beam endplate 48 about the size of the cross-section of an I-beam 38 as an example of how different endplate combinations may be used.

Figure 7E:
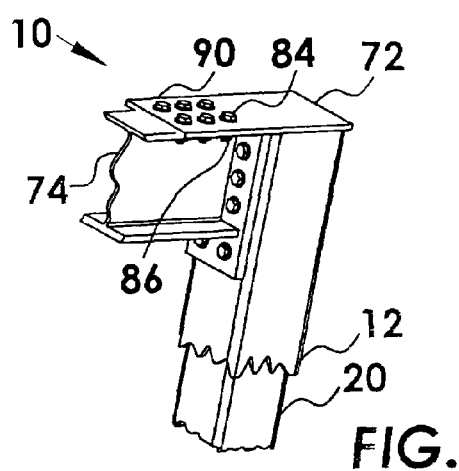
Figure 7F:
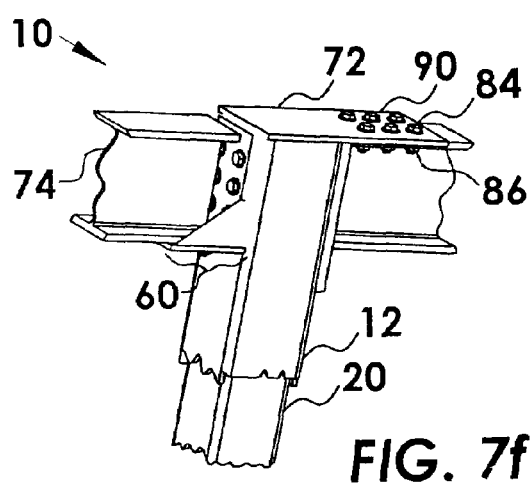

FIGS. 7e and 7f depict a top plate 72 having a single extension 90 as described in FIGS. 6a and 6b, where FIG. 7e shows a perspective view of the moment-resistant building column insert system 10 of FIGS. 6a and 6b, and FIG. 7f further depicts a non-moment connection on one side of the building column 12. It should be evident that numerous combinations of these configurations can be made from the moment-resistant building column insert system 10.

FIGS. 8a-8e depict perspective views of different nut plate-endplate sets 94 for use with different applications with the moment-resistant building column insert system 10, and FIG. 8f depicts a perspective exploded view of nut plate assembly 28. Here, FIG. 8a depicts a nut plate-endplate set 94 having a length and width about the size of the cross-section of an I-beam 38 (not shown). FIG. 8b depicts a nut plate-endplate set 94 comprising an extended nut plate assembly 28 and extended endplate 48 for use with an extended column insert 20 extending beyond the I-beam flanges (40, 42) (not shown). FIG. 8c depicts nut plate-endplate sets 94 for use with a cylindrical moment-resistant building column insert system 10 comprising a beam endplate 48 of generally cylindrical-quadrant shape having a concave endplate side 98 for abutting a cylindrical column 12 and a convex endplate side 100 for incorporating to the I-beam end (44, 46) (not shown). FIG. 8d depicts a nut plate-endplate set 94, where the endplate 48 has an angled bracket 60 for use with a non-moment connection when used with the moment-resistant building column insert system 10, for example. FIG. 8e depicts a nut plate-endplate set 94 having a lower endplate extension 102 for use with a top plate 80 and roof or single story beam 74, as depicted in FIG. 7a-7f, for example. FIG. 8f depicts a nut plate assembly 28 having a top nut plate 148 having a pattern of nut pockets 96 for holding threaded nuts 34 sealed with a back nut plate 150 for holding the nuts 34 coaxially with nut plate holes 36, where the top nut plate 148 and back nut plate 150 are welded together using welding means (not shown). It should be obvious that the nut pockets 96 could be configured to have an opening for frictionally holding (not shown) the threaded nuts 34 in the desired coaxial position, which may be useful for replacing 10 damaged threaded nuts 34.

Figure 9A:
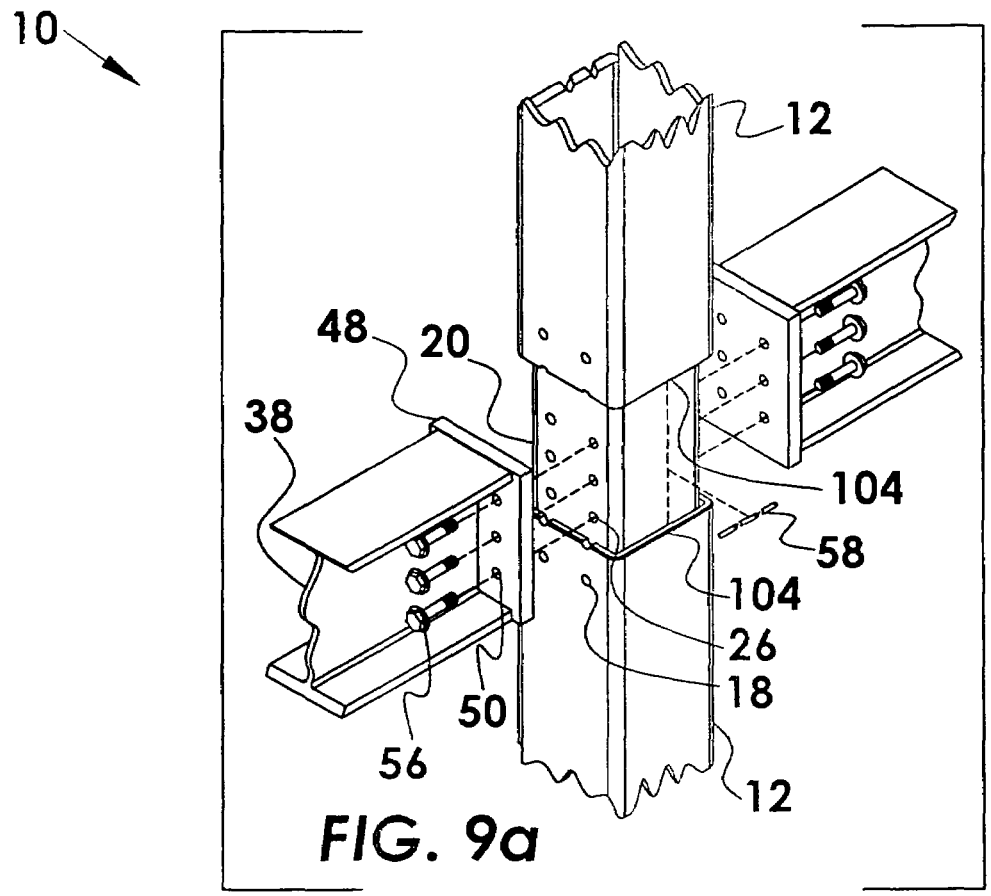
FIGS. 9a-9c depict perspective views of embodiments of the moment-resistant building column insert system having a column splice at an intermediate level.
Figure 9B:
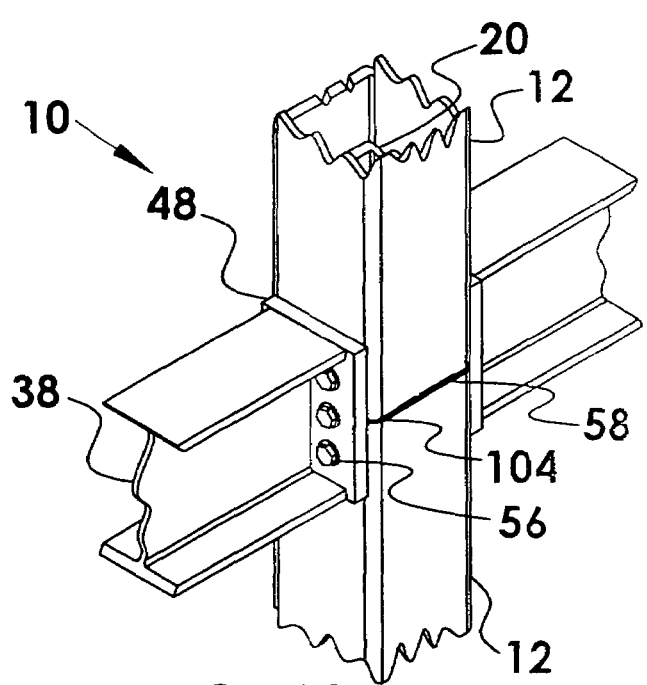
Figure 9C:
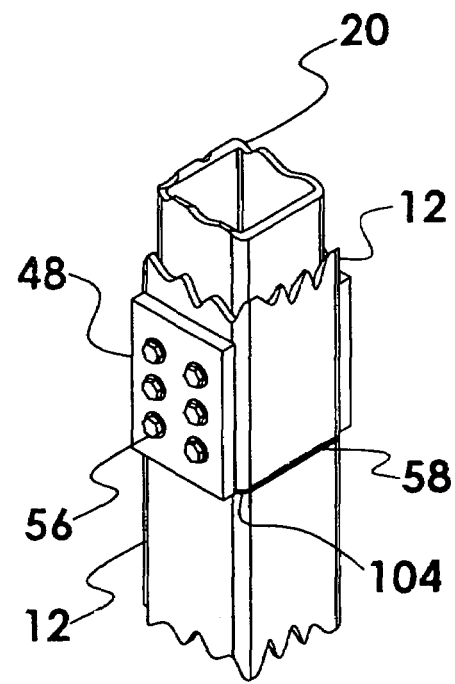

FIGS. 9a-9c depict perspective views of a moment-resistant building column insert system 10 having spliced column 12, where shown is a building column 12 that is transversely spliced along the building column 12. In these embodiments, the column is shop welded 58 to the column insert 20 along the splice seam 104. Alternatively the column insert 20 may pre-installed to an end of a building column 12, then aligned and shop welded 58 in place, for enabling any combination of the aforementioned embodiments of the moment-resistant building column insert system 10. FIG. 9a is an exploded perspective view of a moment-resistant building column insert system 10 for use with spliced building columns 12, where shown is the column insert 20 having column insert mounting holes 26 arranged in a pattern inserted between the ends of a building column splice 104 having mounting holes arranged in a column mounting hole pattern 18 that is segmented by the building column splice 104, where shop welds 58 are depicted in the exploded view as positioned to integrate the column insert 20 with the one of the spliced column 12 elements. A second column 12 is positioned onto the column insert 20 and the patterns of mounting holes are aligned. A plurality of mounting bolts 56 having washers are inserted to the patterns of holes (26, 36, 50) and tightened to threaded nuts 34 on nut plate assemblies 28 (not shown) to fixedly attach the other segmented column 12 to the integrated column insert 20 and lower column 12.

FIG. 9b depicts an assembled moment-resistant building column insert system 10 having spliced column 12 according to the exploded embodiment of the invention depicted in FIG. 9a. Shown are shop welds 58 along the splice seam 104 of the lower column 12 segment of the moment resistant system 10 assembled in the manner described above, where shop welds 58 to both the building column 12 and column insert 20 eliminate the need for field welding.

FIG. 9c depicts an assembled moment-resistant building column insert system 10 having spliced column 12 with the endplates 48 affixed using the mounting bolts 56 inserted through the pattern of holes (not shown) in the endplates 48, an upper building column 12, column insert 20 and nut plate assembly 28 (not shown). In this embodiment, the insert system 10 provides a means for extending the length of the column 12, where I-beams 30 are not attached to the endplates 48. As depicted, the column insert 20 is inserted to a lower building column 12 and the insert 20 and lower building column 12 are incorporated at the splice seam 104 using a plurality of shop welds 58. This embodiment of the moment-resistant building column insert system 10 is useful for reducing the cost of manufacturing extended building columns 12 by creating a moment-resistant connection as a column extension that may be used along a higher-level region of the column 12 where the loads are smaller. At about a mid-length of the column insert 20 the building column 12 is integrated using shop welds in a non-field environment where about half to the column insert 20 protrudes from the bottom building column 12. The column insert 20 has a plurality of patterns of column insert mounting holes 26 (not shown) desirably positioned along the protruding portion of the column insert 20. A second top building column 12 having a plurality of patterns of column mounting holes 18 (not shown) is positioned onto the protruding portion of the column insert 20, where mounting bolts 56 are assembled to nut plate assemblies 28 (not shown) in the field according to the methods previously discussed. In conventional use, no end plates and only field bolting could be used. Alternatively, the endplates 38 may be located on all sides of the column 12, where only two endplates 38 are depicted for illustrating the seam 104 and shop welds 58. Further, the endplates 48 may be of many types such as extended endplates 48 for example as discussed earlier. It should be evident that this embodiment of the moment-resistant building column insert system 10 may be used with columns of alternative shapes such as circular or polygon shapes.

Figure 10:
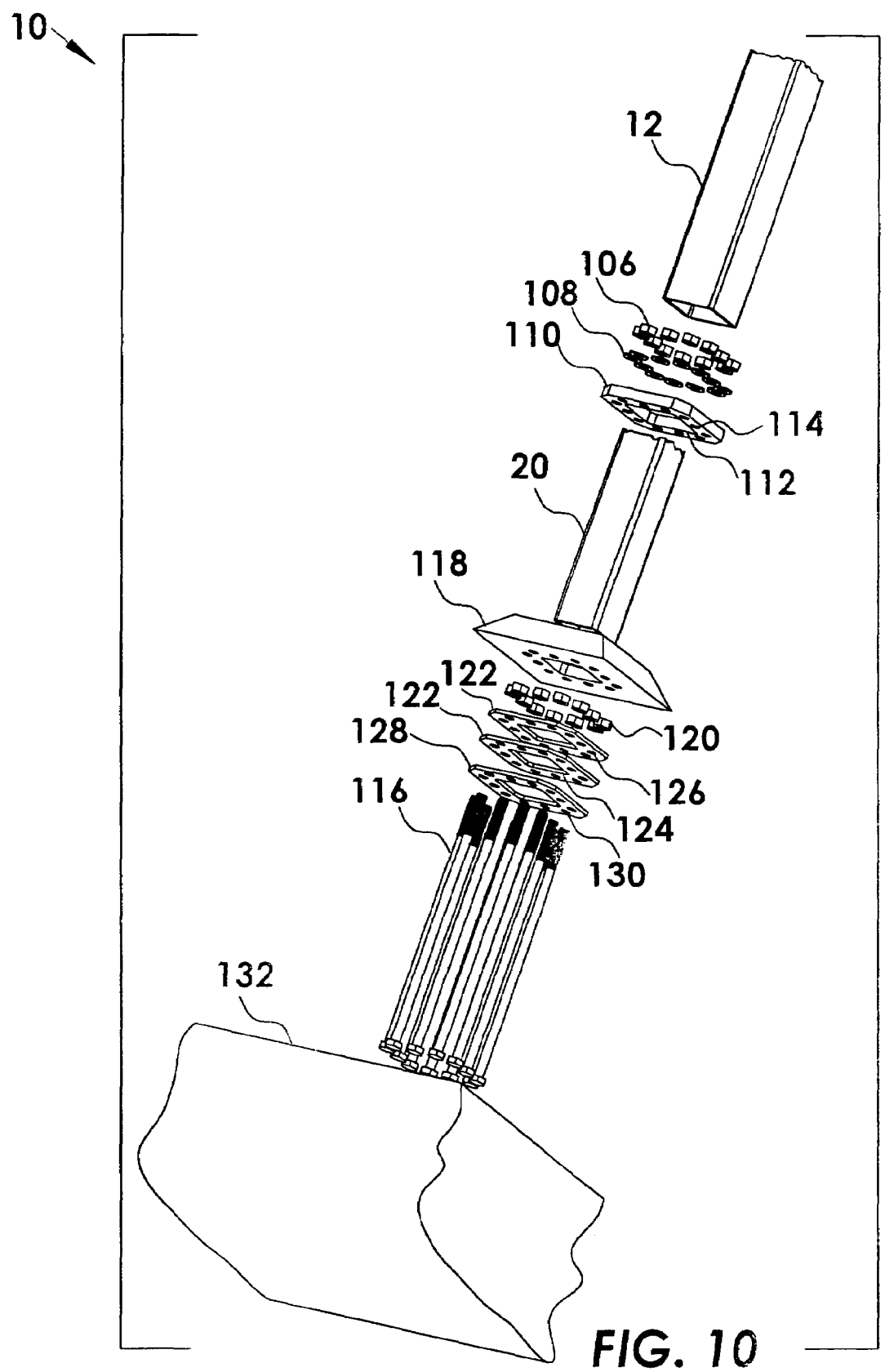
FIG. 10 depicts a perspective exploded view of an embodiment of the a moment-resistant building column insert system at the column base.

FIG. 10 depicts a perspective exploded view of a moment-resistant building column insert system 10 for use at the base of the building column 12 and a foundation, according to one embodiment of the current invention. Shown is the building column 12 depicted having top portion cutaway for illustrative purposes and a plurality of threaded anchor nuts 106 having anchor washers 108 for abutting a base plate 110, where the base plate 110 is transversely incorporated to the lower portion of the building column 12 using shop welding 58 (not shown). The base plate 110 is of generally planar-rectangle shape having a generally rectangular building column port 112 for receiving the building column 12 there through. The base plate has a plurality of base plate anchor bolt holes 114 there through in a pattern along the perimeter of the base plate 110 for receiving a plurality of threaded anchor bolts 116 there through. A column insert 20 is depicted with the top end of the column insert 20 cut away for illustrative purposes. A mortar element 118 is depicted where, in final assembly, the base plate 110 abuts the mortar element 118 then the anchor nuts 106 having anchor washers 108 are tightened to the threaded anchor bolts 116 (See FIG. 11a). A plurality of threaded positioning anchor nuts 120 are located along the threaded anchor bolts 116 for defining where the base plate 110 will rest in relation to the column insert 20 and are encased in the grout as will be discussed in FIGS. 11a-11c. A plurality of column insert plates 122 of generally planar-rectangle shape having a column insert port 124 for receiving the column insert 20 are depicted with a plurality of insert plate anchor bolt holes 126 there through in a pattern along the perimeter of the insert plate 122. A bottom insert plate 128 is depicted having a plurality of bottom insert plate anchor bolt holes 130 there through in a pattern along the perimeter of the bottom insert plate 128, where the bottom insert plate 128 is transversely incorporated beneath the column insert 20 using the plurality of threaded anchor bolts 116. Further depicted is a cutaway view of a concrete foundation 132 for integrated with the column insert 20, the column insert plates 122 and threaded anchor bolts 116 using vibrating means before the concrete foundation 132 is hardened.

FIGS. 11a, 11b and 11c depict planar cutaway views of a moment-resistant building column insert system 10 at the column base and the sub assemblies thereof, where the sub assemblies comprise a building column base assembly 134 (see FIG. 11b) and a column insert base assembly 136 (see FIG. 11c).

Shown in FIG. 11a is the moment-resistant building column insert system 10 at the base of a building column 12 of FIG. 10, where a building column 12 has the bottom end fixedly attached to the building concrete foundation 132 depicted as a cutaway concrete foundation 132. A column base plate 110 of generally planar-rectangle shape having a generally rectangular building column port (not shown) for receiving the building column 12 there through is incorporated transverse to the building column near the building column bottom end using shop welding 58 (see FIG. 11b). The column base plate 110 has a plurality of base plate anchor bolt holes 114 (not shown) there through in a pattern along the perimeter of the base plate 110 for receiving a plurality of threaded anchor bolts 116 there through. A cutaway building column insert 20 of generally hollow rectangular cross-section is depicted partially inserted to the bottom end of the building column 12 and further depicted having the bottom end of the column insert 20 protruding downward from the bottom end of the building column 12. A plurality of column insert plates 122 of generally planar-rectangle shape have a column insert port 124 (not shown) for receiving the column insert 20 there through are incorporated transverse along the length of the column insert 20 and a bottom insert plate 128 is incorporated beneath and transverse to the bottom end of the column insert 20 using anchor bolts 116 and shop welding means 58 (not shown). The insert plates (122, 128) have a plurality of anchor bolt holes (126, 130) there through (not shown) in a pattern along the perimeters of the insert plates (122, 128), where the insert plates (122, 128) may be positioned and secured by sliding the plates along the anchor bolts then welding in place or using a plurality of threaded positioning anchor nuts 120 along the lengths of the anchor bolts 116, where the anchor bolts 116 can be all-thread bolts (not shown).

The concrete foundation is integrated with the column insert 20, column insert plates 122, bottom insert plate 128 and anchor bolts 116 using vibrating means before the concrete is hardened. Further, a mortar element 118 is integrated with the bottom end of the column 12, positioning anchor nuts 120, and column base plate 110. A plurality of threaded anchor nuts 106 are tightened to the anchor bolts 116 when the anchor bolts 116 are inserted through the base plate anchor bolt holes 114, insert plate anchor bolt holes 126 and solid insert plate anchor bolt holes 130 to secure the base plate 110 and building column 12 to the concrete foundation 132.

FIG. 11b depicts a planar cutaway view of a building column base assembly 134, comprising a base plate 110 transversely integrated near the bottom end of the building column 12 using shop welding 58 located on the top and bottom sides of the base plate 110. The building column base assembly 134 is shown having a column base projection 138 beneath the bottom side of the base plate 110 for welding and integrating with the mortar element 118 and or concrete foundation 132.

Incorporating the base plate 110 near the bottom of the column 12 can be done using shop welding 58, where shop welds 58 are about 2 inches to 6 inches in length on each side of the base plate.

FIG. 11c depicts a column insert base assembly 136, where shown are a plurality of insert plates 122 and a bottom insert plate 128 that are transversely incorporated along the lower portion of the column insert 20 using a plurality of anchor bolts 116 inserted through the plurality of insert plate anchor bolt holes 126 in a pattern along the perimeter of the insert plates 122. The insert plates (122, 128) have an insert plate port 124 (not shown, see FIG. 10) when position along the lower portion of the column insert 20 and below the column insert 20 for the bottom insert plate 128. The bottom insert plate 128 is shown positioned below the bottom end of the column insert 20 using the anchor bolts 116. Further depicted are positioning anchor nuts 120 on the anchor bolts 116 for positioning the bottom surface of the base plate 110 attached near the bottom end of the building column 20 when the building column 12 is lowered onto the column insert 20 then fixedly secured by rotatably tightening the threaded anchor nuts 106 to the anchor bolts 116.

Figure 12:
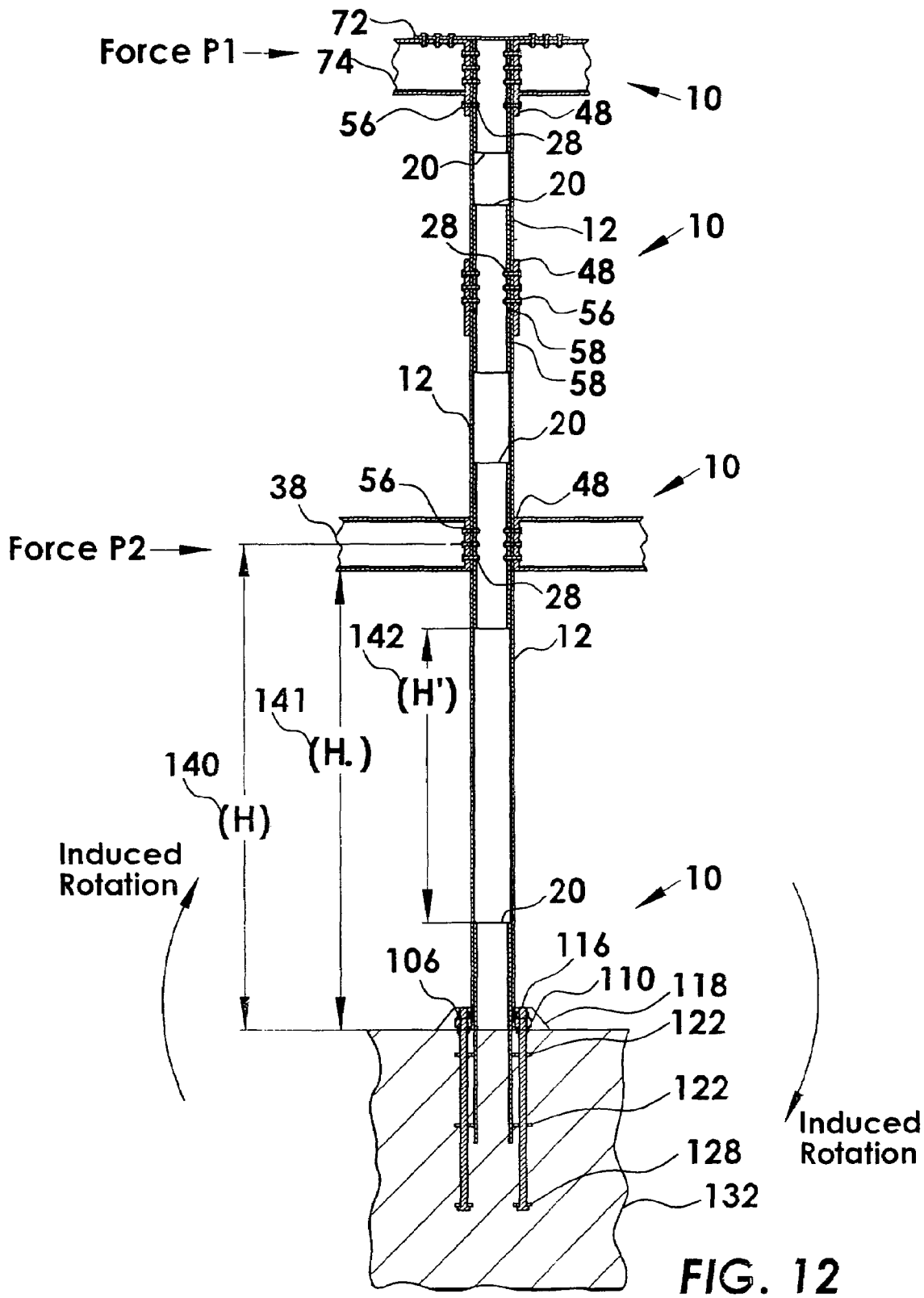
FIG. 12 depicts embodiments of the moment-resistant building column insert system combination located at the column top, along the intermediate column span and at the column base.

FIG. 12 depicts planar, partial cutaway view of a moment-resistant building column insert system 10 located at a column top for roof beams, along the column 12 span to connect multiple columns 12 together in a collinear manner at a column splice 104, along the column 12 span for mid-level I-beams 38 and at a column base for foundation connections, where the system comprises connections using bolted connections. Shown is a lateral force P1 acting along the roof beams 74 located at the top of the column 12 and lateral force P2 acting along the I-beams 38 for illustrating bending stress heights with and without the moment-resistant building column insert system 10, where the moment-resistant building column insert system 10 provides additional bending strength. The modeled height of the column can vary, and often the height of the column is modeled at the middle of the beam, depicted as (H) 140. With the use of some moment resisting joints, the column 12 can be made stiff enough at the beams 38 such that the effective column height is offset to the bottom flanges 42 of the beam(s) 38 depicted as $(H_o)$ 141. Implementing the moment-resistant building column insert system 10 where the column insert 20 extends above and below the beams 38 provides a similar but enhanced effect. The strength and stiffness added to the column 12 by the moment-resistant building column insert system 10 reduces the effective column height an additional amount, depicted as (H') 142. The amount of height reduction varies according to the properties of the assembly elements. The moment-resistant building column insert system 10 further reduces the height of the un-strengthened and un-stiffened column 12 resulting in a maximum reduced effective column height (H') 142 that is typically between $(H_o)$ 141 and (H') 142.

Lateral forces P1 and P2 acting along roof beams 74 and I-beams 38 induce shear forces at the column base connection where a point of inflexion exists along the column 12 providing an effective pivot point. The moment at the base of the building column 12 is subject to the largest bending load. A connection at the foundation that does not have the moment-resistant building column insert system 10 is more susceptible of over stress by these lateral forces. The moment-resistant building column insert system 10 provides additional bending strength at the foundation and additional shear strength at the base. The column insert 20 is extended into the foundation 132 to provide shear resistance and/or additional moment resistance as is needed for larger HSS columns. The insert increases the plastic moment capacity (MP) at the connection of the column 12 to the beam(s) (74, 38) and the foundation 132. This allows the moment-resistant building column insert system 10 to meet code requirements regarding strong column—weak beam requirements. It also increases beam and foundation offset distances to effectively reduce column height and reduce deflection, which often governs design requirements.

Further depicted is the direction of induced rotation of the connection between the foundation 132 the column 12, where shown are arrows depicting the rotation direction. The resisting rotation supplied by the building column insert system 10 is in the opposite direction.

Figures 13A, 13B:
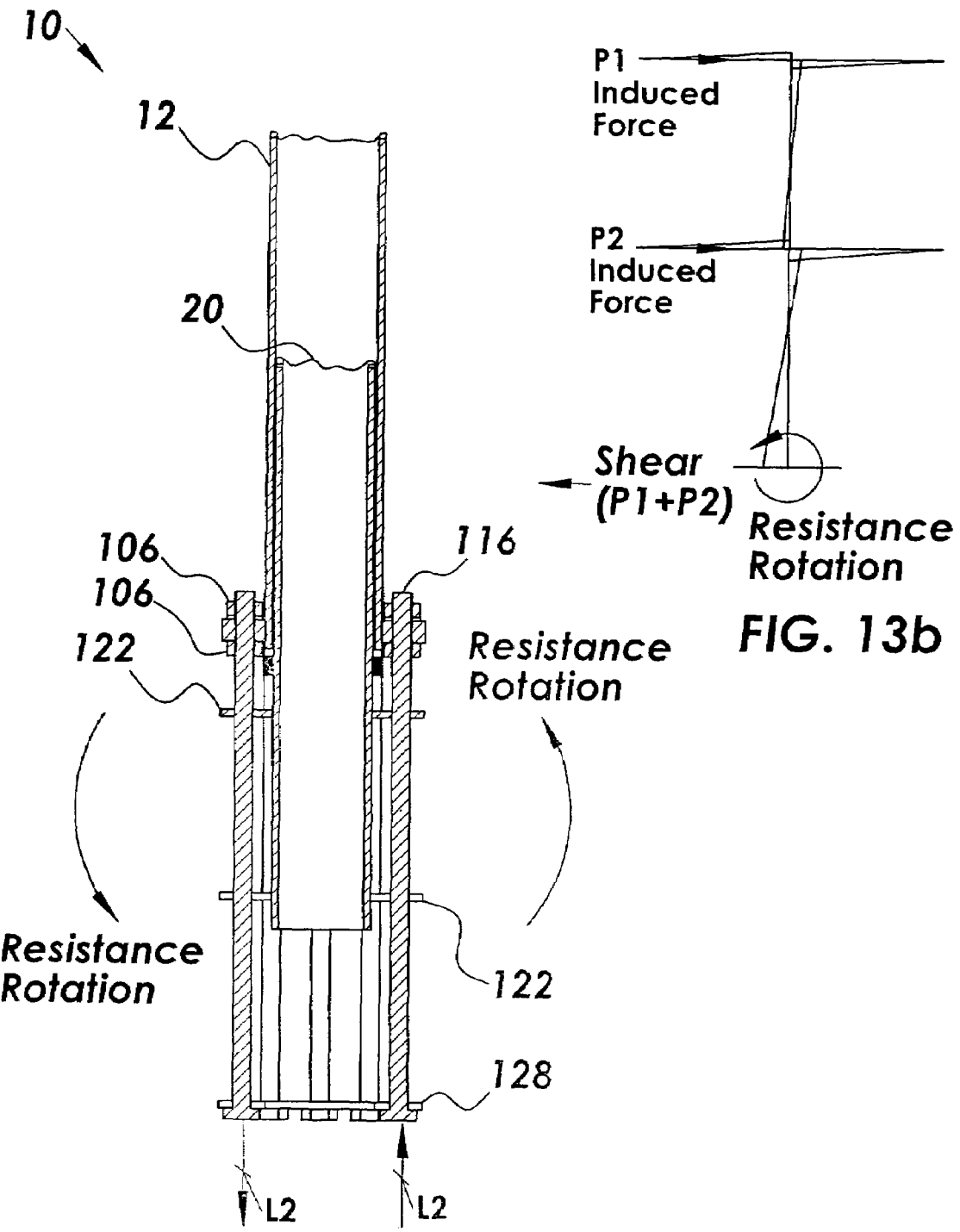
FIGS. 13a and 13b depict the moment resistant forces at the foundation resulting from lateral forces acting along roof beams and I-beams.

Referring now to FIGS. 12, 13a and 13b, at the foundation, loads P1 and P2 induce a moment in the column 12 at the bottom of the column. The moment induced in the column 12 is transferred to the base plate 110 via welds 58 (not shown). The induced moment is then transferred to the anchor bolts 116. The anchor bolts 116 transfer the moment to the earth. The resisting moment follows the opposite path.

The resisting moment between the foundation 132 and the anchor bolts 116 results from opposing tension and compression forces in the anchor bolts 116 a distance L2 apart. This resisting moment is transferred to the base plate 110 via the nuts 106 above and below the base plate 110. In turn, the resisting moment is then transferred to the column 12 via bending and shear in the base plate 110 to the welds 58 above and below the base plate 110 (see FIG. 11b), between the base plate 110 and the column 12.

These embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A moment-resistant building column insert system comprising:
   a. a vertical building column of generally hollow rectangular or cylindrical cross-section having inner walls and outer walls with a plurality of patterns of transverse mounting holes there through and having a building column top end for incorporating with a plurality of roof or single story beams, a bottom building column end for incorporating to a building foundation, and a plurality of building column intermediate spans for incorporating to a plurality of I-beams;
   b. a building column insert of generally hollow rectangular or cylindrical cross-section having a column insert top end and a column insert bottom end with inner column insert walls and outer column insert walls inserted to the building column inner walls at the building column top end, at the building column bottom end and along the column, wherein the column insert outer wall sizes are less than the building column inner walls sizes, to enable frictional, slidable or free fitting within the building column with a plurality of transverse column insert mounting holes arranged in a pattern there through and aligned with the plurality of patterns of building column transverse building column mounting holes;

c. a plurality of steel I-beams have a cross section height from an I-beam top planar flange to an I-beam bottom planar flange;

d. a plurality of beam endplates of generally rectangular or cylindrical-quadrant shape incorporated to a plurality of building I-beam ends, wherein one side of the beam endplate abuts an I-beam end and another side of the beam end plate abuts the building column outer wall and the endplate has a pattern of mounting holes there through for aligning to the similar pattern of building column mounting holes;

e. a plurality of nut plate assemblies of generally rectangular or cylindrical-quadrant shape and about the size of the beam endplates comprising a top nut plate with a plurality of nut pockets arranged in a pattern for holding a plurality of threaded nuts and the top nut plate is sealed by a back nut plate using welding means for holding the nuts in the nut pockets coaxially with a plurality of nut plate assembly mounting holes arranged in a pattern similar to the column insert mounting holes through the top nut plate and back nut plate and aligned with the column insert mounting holes, where one side of the back nut plate abuts the column insert inner wall and is welded there to;

f. a plurality of mounting bolts inserted through the plurality of patterns of endplate mounting holes; through the pattern of building column mounting holes, through the of patterns of column insert mounting holes and through the patterns of nut plate assembly mounting holes in the back nut plate and rotatably tightened to the plurality of threaded nuts held by the nut plate assembly;

g. a column base plate of generally planar rectangle shape having a generally rectangular building column port for receiving the building column there through is incorporated transverse to the column bottom end using welding means, wherein the column base plate has a plurality of anchor bolt holes there through in a pattern along the base plate perimeter for receiving a plurality of threaded anchor bolts there through;

h. a plurality of column insert plates of generally planar-rectangle shape having a generally rectangular column insert port for receiving the column insert there through are incorporated transverse along the column insert length and the column insert plates are further incorporated beneath the column insert bottom end using the plurality of anchor bolts having a plurality of threaded positioning nuts along the anchor bolt lengths or using welding means, wherein the column insert plates have a plurality of anchor bolt holes there through in a pattern along the column insert plate perimeter;

i. a concrete foundation integrated with the column insert, column insert plates and anchor bolts, wherein the concrete is integrated using vibrating means before hardening;

j. a plurality of anchor nuts are threadably tightened to the anchor bolts positioned in the base plate anchor bolt holes to secure the base plate and building column to the concrete foundation and column insert; and k. a mortar base integrated with the column bottom end, anchor nuts, anchor bolts having washers, and column base plate.

2. The moment-resistant building column insert system of claim 1 wherein the nut plate assembly has threaded nuts frictionally fitted to one side of the nut plate assembly using nut pockets having openings for receiving threaded nuts incorporated to one side of the top nut plate.

3. The moment-resistant building column insert system of claim 1 wherein the beam endplate width is about the width of the I-beam cross section width and the beam endplate height is about the height of the I-beam cross section height.

4. The moment-resistant building column insert system of claim 1 wherein the beam endplate length extends up to 24-inches beyond the I-beam top flange and extends up to 24-inches beyond I-beam bottom flange and has a pattern of mounting holes there through for aligning coaxially with the pattern of building column mounting holes, building column insert mounting holes, and nut plate assembly mounting holes.

5. The moment-resistant building column insert system of claim 1, wherein the beam endplate further comprises a pair of angle gusset plates of generally triangular shape incorporated substantially normal to the beam endplate and a bracket plate of generally rectangular shape incorporated between the angle plates and substantially normal to the angle plates and endplate and having a pattern of bracket plate mounting holes there through, wherein the I-beam bottom flange rests on the racket plate and has a pattern of bottom surface mounting holes through the I-beam bottom planar surface aligned with the bracket plate mounting holes for receiving a plurality of bracket plate mounting bolts there through and tightened to a plurality of threaded nuts having washers there between.

6. The I-beam of claim 5 wherein the I-beam is a wood beam of generally rectangular cross section having a top surface and a bottom surface, wherein a plurality of lag screw holes are positioned transversely in the wood beam bottom surface aligned with the plurality of bracket plate mounting holes for receiving a plurality of lag mounting bolts and tightened therein.

7. The moment-resistant building column insert system of claim 1, further comprising a top plate transversely incorporated to the building column top end using welding means and transversely incorporated to the column insert top end using welding means, wherein the top plate has a plurality of top plate extensions having a plurality of top plate mounting holes there through aligned with a pattern of I-beam top flange mounting holes there through for receiving a plurality of top plate mounting bolts there through and tightened to a plurality of threaded nuts having washers there between.

8. The top plate of claim 7 wherein the plurality of top plate extensions are in a cross-pattern.

9. The top plate of claim 7 wherein the plurality of top plate extensions are in an L-pattern.

10. The top plate of claim 7 wherein the plurality of top plate extensions are in a T-pattern.

11. The top plate of claim 7 wherein the top plate extension is a single extension.

12. The moment-resistant building column insert system of claim 1, wherein two building columns are joined at a transverse splice to create a spliced end of a lower column and a spliced end of an upper column for receiving the column insert about symmetrically therein, wherein a plurality of column mounting holes are about symmetrically spaced between the spliced ends for coaxially aligning with the column insert mounting holes.

13. The spliced columns of claim 12 wherein the column insert is inserted to about a column insert mid-length to one column splice end and integrated using welding means and about half to the column insert and the pattern of column insert mounting holes protrude from the spliced building column, where the second building column having a plurality of patterns of column mounting holes is positioned onto the protruding column insert portion to align the patterns of mounting holes of the column insert and mounting bolts are assembled to end plates and nut plate assemblies.

14. The moment-resistant building column insert system of claim 1, wherein the building column, column insert, base plate port and insert plate ports are polygons having a plurality of sides.

15. The moment-resistant building column insert system of claim 1, wherein the system is filled members selected from a group consisting of concrete or grout.

16. A moment-resistant building column insert system comprising a building column and a building column insert, wherein the building column insert is integrated to the building column selected from a group of column regions consisting of a top building column end, a bottom building column end, and an intermediate span along the building column, wherein the building column top end and column insert are integrated to a plurality of transverse roof beams with a top plate, and the building column bottom end and column insert are fixedly incorporated to a building foundation, and the building column intermediate span and column insert are integrated to a plurality of transverse I-beams.

17. A method of a using moment-resistant building column insert system comprising the steps of:
   a. creating a plurality of mounting holes in a building column of generally hollow rectangular shape for receiving a plurality of mounting bolts there through;
   b. creating a plurality of mounting holes arranged in a pattern in a column insert of generally hollow rectangular shape for receiving a plurality of mounting bolts there through;
   c. inserting a portion of the column insert to the building column and incorporating by welding;
   d. aligning column insert mounting holes concentric to the building frame column mounting holes;
   e. creating a plurality of nut plate assemblies having a top nut plate having a pattern of nut pockets for holding threaded nuts coaxially with patterns of nut plate holes and sealed with a back nut plate using welding;
   f. positioning the nut plate assemblies inside the column insert with the back nut plate abutting the column insert inside surface and aligning the nut plate mounting holes coaxially with the column insert mounting holes and welding there to,
   g. incorporating a beam endplate to an end of an I-beam using welding means;
   h. creating a pattern of mounting column holes in the endplate;
   i. positioning the beam endplate mounting holes coaxially to the building column mounting holes;
   j. inserting a plurality of mounting bolts through the endplate mounting holes and through the building column mounting holes and through the column insert mounting holes and through the nut plate assembly mounting holes in the back nut plate;
   k. rotating the mounting bolts into the threaded nuts for fixedly securing the I-beam to the building column insert;
   l. welding a base plate to a building column bottom end, wherein the base plate has a building column port for receiving the building column bottom end there through, wherein the base plate has a plurality of anchor bolt mounting holes in a pattern along the perimeter there through;
   m. welding an insert plate transverse to a hollow column insert having a top end and a bottom end, wherein the insert plate has an insert column port for receiving the column insert there through and has anchor mounting bolt holes along the perimeter there through;
   n. assembling a plurality of insert plates of generally planar-rectangular shape having a plurality of anchor mounting bolt holes in a pattern along the perimeter there through in a plurality of tiers below the insert column bottom end using a plurality of positioning threaded nuts along a plurality of threaded anchor mounting bolts inserted through the anchor mounting bolt holes;
   o. bonding the insert plates and column insert with concrete and grout to a building foundation and using vibrating means before hardening, wherein a top end of the column insert projects upward from the foundation to a predetermined height, wherein the anchor bolts project above the building foundation a predetermined height;
   p. sliding the hollow building column and base plate onto the column insert and anchor bolts, wherein the anchor bolts insert through the pattern of base plate anchor bolt mounting holes;
   q. sliding a plurality of washers onto the anchor bolts;
   r. rotating a plurality of anchor nuts onto the anchor bolts until tightened to a predetermined force;
   s. placing a grout pad between the base plate and the foundation; and,
   t. filling the building column insert system with concrete or grout or concrete and grout.

\* \* \* \* \*